United States Patent
Kobayashi

(10) Patent No.: US 10,591,851 B2
(45) Date of Patent: Mar. 17, 2020

(54) IMAGE FORMING APPARATUS AND IMAGE FORMING METHOD FOR ADJUSTING POSITION OF IMAGE FORMED ON RECORDING MEDIUM

(71) Applicant: Yukifumi Kobayashi, Kanagawa (JP)

(72) Inventor: Yukifumi Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/139,240

(22) Filed: Sep. 24, 2018

(65) Prior Publication Data

US 2019/0171137 A1    Jun. 6, 2019

(30) Foreign Application Priority Data

Dec. 6, 2017    (JP) ................. 2017-234561

(51) Int. Cl.
| | | |
|---|---|---|
| G06F 15/00 | (2006.01) | |
| G06K 1/00 | (2006.01) | |
| G06K 15/00 | (2006.01) | |
| G03G 15/20 | (2006.01) | |
| G03G 15/23 | (2006.01) | |
| G03G 15/36 | (2006.01) | |
| H04N 1/00 | (2006.01) | |
| G03G 15/00 | (2006.01) | |

(52) U.S. Cl.
CPC ....... G03G 15/2014 (2013.01); G03G 15/231 (2013.01); G03G 15/36 (2013.01); G03G 15/5062 (2013.01); H04N 1/00 (2013.01); G03G 15/5087 (2013.01)

(58) Field of Classification Search
CPC .......... G06G 15/2014; G06G 15/231
USPC ........................ 358/1.18, 1.1, 1.15
See application file for complete search history.

(56) References Cited

U.S. PATENT DOCUMENTS

| | | | |
|---|---|---|---|
| 2003/0170552 A1* | 9/2003 | Miyashita | G03F 7/70058 430/30 |
| 2004/0215411 A1 | 10/2004 | Howe | |
| 2006/0110189 A1* | 5/2006 | Matsuda | G03G 15/0131 399/301 |
| 2013/0195482 A1 | 8/2013 | Nakura et al. | |
| 2015/0378297 A1 | 12/2015 | Nakura et al. | |
| (Continued) | | | |

FOREIGN PATENT DOCUMENTS

| | | |
|---|---|---|
| JP | 2006-264900 | 10/2006 |
| JP | 2013-053004 | 3/2013 |
| | (Continued) | |

*Primary Examiner* — Douglas Q Tran
(74) *Attorney, Agent, or Firm* — Harness, Dickey & Pierce P.L.C.

(57) ABSTRACT

An image forming apparatus, in which an image forming method is performed, includes an image forming device to form an image on a recording medium, a reading device to scan the recording medium having a mark and generate a scanned image, and circuitry to calculate a correction value to adjust a position of the image to be formed on the recording medium, based on the scanned image. The circuitry calculates the correction value to adjust a position of an image to be formed on a second face of the recording medium based on a first scanned image generated from a first face of the recording medium, within a period from when the first scanned image is generated from the first face to when the image starts to be formed on the second face.

18 Claims, 19 Drawing Sheets

(56) References Cited

U.S. PATENT DOCUMENTS

| | | |
|---|---|---|
| 2017/0131671 A1 | 5/2017 | Nishimura et al. |
| 2018/0152576 A1* | 5/2018 | Arai .................. G03G 15/6567 |
| 2018/0159989 A1* | 6/2018 | Mizuno ............. H04N 1/00082 |

FOREIGN PATENT DOCUMENTS

| | | |
|---|---|---|
| JP | 2016-180857 | 10/2016 |
| JP | 2017-032922 | 2/2017 |

\* cited by examiner

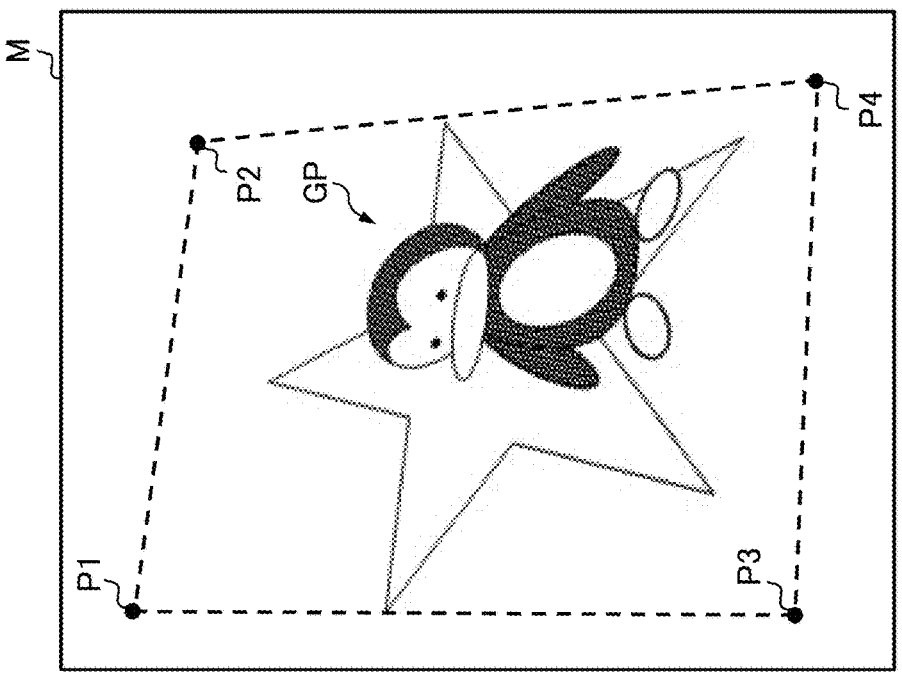
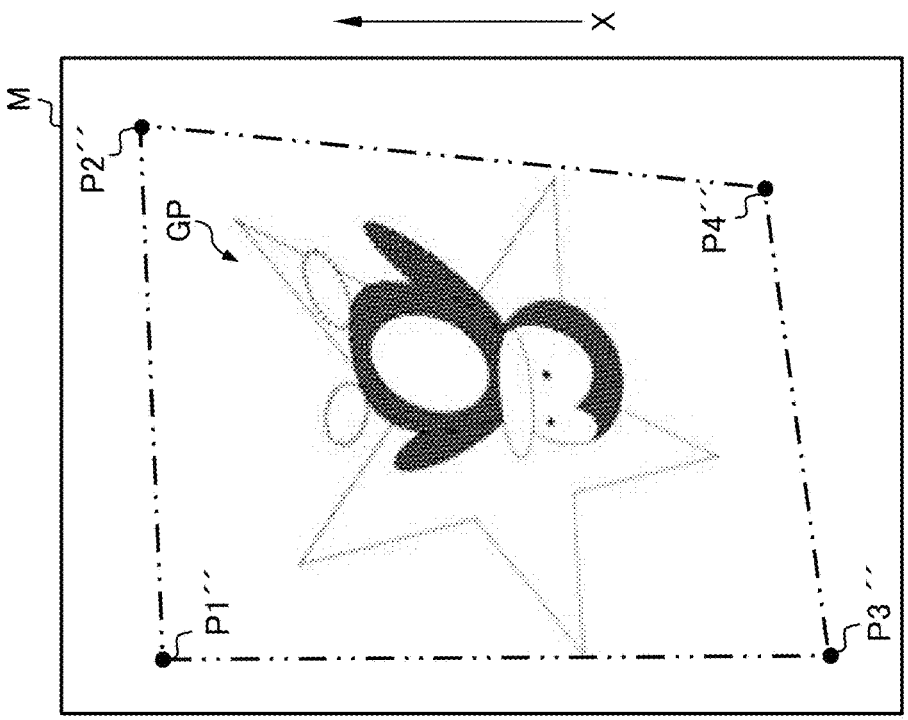

IMAGE FORMING APPARATUS AND IMAGE FORMING METHOD FOR ADJUSTING POSITION OF IMAGE FORMED ON RECORDING MEDIUM

CROSS-REFERENCE TO RELATED APPLICATION

This patent application is based on and claims priority pursuant to 35 U.S.C. § 119(a) to Japanese Patent Application No. 2017-234561, filed on Dec. 6, 2017, in the Japan Patent Office, the entire disclosure of which is hereby incorporated by reference herein.

BACKGROUND

Technical Field

This disclosure relates to an image forming apparatus and an image forming method.

Related Art

The position of a print image has been adjusted manually with a highly dedicated skill. However, in recent years, it has been proposed that an image positioning device adjusts the position of an image by checking the image, as a post processing of printing. Such an image positioning device reads image data of a print by an external scanner, obtains an adjusting value of the image position based on the scanned image, and adjusts the image position of the print.

However, depending on a fixing process after image formation and a cut shape of a recording medium, for example, known image positioning devices cannot correctly grasp the shape of the recording medium used for printing. Therefore, even if the respective image positions are adjusted between a first face (i.e., a front face) of a recording medium and a second face (i.e., a back face) of the recording medium, a relative positional deviation of an image to be printed on the second face is generated, relative to the first face.

Further, in order to adjust the relative position of the images on the first face side and the second face side of the recording medium after grasping the shape of the recording medium used for printing, a correction value of the second face side of the recording medium is specified before an image is printed on the second face side. At this time, since the known image positioning apparatus is to scan a printed medium by an external scanner, a scanned image on the first face side of the recording medium cannot be obtained before an image is printed on the second face side of the recording medium. Accordingly, it is difficult to produce a printed medium having high accuracy in position of the image.

SUMMARY

At least one aspect of this disclosure provides an image forming apparatus including an image forming device, a reading device, and circuitry. The image forming device is configured to form an image on a recording medium. The reading device is configured to scan the recording medium having a position detection mark on the recording medium as the image and generate a scanned image. The circuitry is configured to calculate a correction value to adjust a position of the image to be formed on the recording medium, based on the scanned image. The reading device is configured to generate a first scanned image from a first face of the recording medium. The circuitry is configured to calculate the correction value, to adjust a position of an image to be formed on a second face of the recording medium based on the first scanned image generated from the first face of the recording medium, within a period from when the first scanned image is generated from the first face of the recording medium to when the image starts to be formed on the second face of the recording medium.

Further, at least one aspect of this disclosure provides an image forming apparatus including an image forming device, a fixing body, a branching portion, a reading device, and circuitry. The image forming device is configured to form an image on a recording medium. The fixing body is configured to fix the image formed on the recording medium to the recording medium. The branching portion is configured to change a direction of the recording medium on which the image is formed, between a direction toward an outside of the image forming apparatus and a direction to a passage conveying the recording medium in a different direction from the direction toward the outside of the image forming apparatus. The reading device is configured to scan the recording medium having a position detection mark on the recording medium as the image and generate a scanned image. The reading device is disposed between the fixing body and the branching portion in a sheet conveying direction of the recording medium. The circuitry is configured to calculate a correction value to adjust a position of the image to be formed on the recording medium, based on the scanned image.

Further, at least one aspect of this disclosure provides an image forming method including forming an image on a recording medium, scanning a first face of the recording medium having a position detection mark on the recording medium, generating a first scanned image from the first face of the recording medium, and calculating a correction value to adjust a position of an image to be formed on a second face of the recording medium based on the first scanned image generated from the first face of the recording medium, within a period from when the first scanned image is generated from the first face of the recording medium to when the image starts to be formed on the second face of the recording medium.

BRIEF DESCRIPTION OF THE SEVERAL VIEWS OF THE DRAWINGS

An exemplary embodiment of this disclosure will be described in detail based on the following figured, wherein:

FIG. 17 is a diagram illustrating yet another state in which a correction value to adjust the position of the image is calculated, according to an embodiment of this disclosure;

FIG. 18 is a diagram illustrating yet another state in which a correction value to adjust the position of the image is calculated, according to an embodiment of this disclosure;

DETAILED DESCRIPTION

Figure 1:
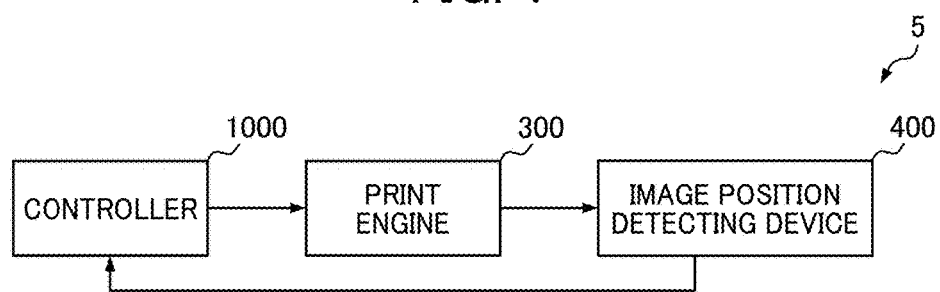
FIG. 1 is a diagram illustrating an overall configuration of an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Hereinafter, a detailed description is given of an embodiment of this disclosure with reference to the drawings.

In the present embodiment, a description is given of an image forming apparatus that includes an image position detecting device to adjust a position of an image based on a scanned image obtained by scanning position detection marks for detecting the position of the image formed on a recording medium, so that the image is output at a target position on the recording medium.

It is to be noted that elements (for example, mechanical parts and components) having the same functions and shapes are denoted by the same reference numerals throughout the specification and redundant descriptions are omitted.

FIG. 1 is a diagram illustrating an entire configuration of an image forming apparatus 5 according to the present embodiment of this disclosure.

The image forming apparatus 5 may be a copier, a facsimile machine, a printer, a multifunction peripheral or a multifunction printer (MFP) having at least one of copying, printing, scanning, facsimile, and plotter functions, or the like. According to the present example, the image forming apparatus 5 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., an OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

As illustrated in FIG. 1, the image forming apparatus 5 according to the present embodiment includes a controller 1000, a print engine 300, and an image position detecting device 400.

The controller 1000 generates image data to be printed out based on a print job received by the image forming apparatus 5. In other words, the controller 1000 generates bitmap data that is an output target image. Then, the controller 1000 controls the print engine 300 based on the bitmap data, so as to execute an output of a formed image.

The print engine 300 functions as an image forming part that executes an output of a formed image on a recording medium such as a print sheet M based on the bitmap data under a control of the controller 1000.

The image position detecting device 400 scans position detection marks (e.g., position detection marks 7) that are printed on the print sheet M and calculates a correction value to correct so that the bitmap data is output at a target position on the print sheet M based on the scanned image.

The correction value calculated by the image position detecting device 400 is transmitted to the controller 1000 to be used as a correction value for generating bitmap data and a correction value for conveying the print sheet M to the print engine 300.

The image position detecting device 400 according to the present embodiment of this disclosure calculates a correction value based on coordinates of end portions of the print sheet M and center coordinates of the position detection mark on the print sheet M, on the above-described scanned image. Depending on a cutting shape and thickness of the print sheet M, positional deviations are generated to the coordinates of the end portions of the print sheet M and the image to be printed on the print sheet M. However, in order to eliminate the positional deviations, the correction value is calculated to be used when outputting a formed image.

Details of the calculation of the correction value will be described below.

Figure 2:
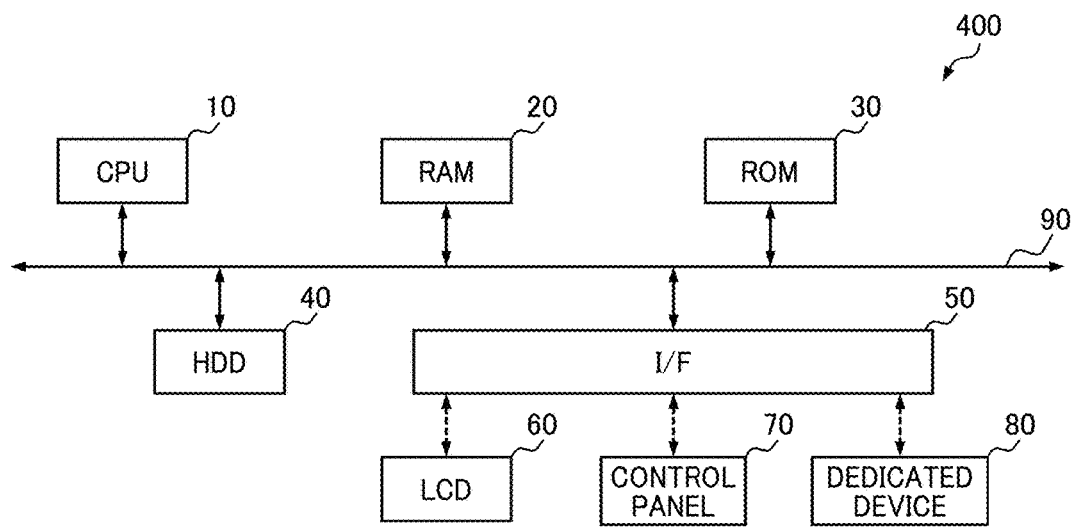
FIG. 2 is a block diagram illustrating a hardware configuration of an image position detecting device according to an embodiment of this disclosure.

Here, a description is given of hardware configurations constructing functional blocks of the controller 1000, the print engine 300, and the image position detecting device 400 according to the present embodiment, with reference to FIG. 2.

FIG. 2 is a block diagram illustrating a hardware configuration of the image position detecting device 400 according to an embodiment of this disclosure.

It is to be noted that the hardware configuration of the image position detecting device 400 is illustrated in FIG. 2. However, similar hardware configuration applies to that of the controller 1000 and the print engine 300.

As illustrated in FIG. 2, the image position detecting device 400 according to the present embodiment has a configuration similar to that of general-purpose information processing devices such as personal computers (PCs) and servers. In other words, a central processing unit (CPU) 10, a random access memory (RAM) 20, a read only memory (ROM) 30, a hard disk drive (HDD) 40, and an interface (I/F) 50, which are connected to each other via a bus 90 in the image position detecting device 400 according to the present embodiment.

Moreover, the I/F 50 may be connected to a liquid crystal display (LCD) 60, a control panel 70, and a dedicated device 80.

The CPU 10 serves as a computation unit and controls the entire operation of the image position detecting device 400.

The RAM 20 is a volatile memory capable of reading and writing data at high speed and is used as a working area when the CPU 10 processes data.

The ROM 30 is a read-only non-volatile memory, and stores programs such as firmware programs.

The HDD 40 is a data readable/writable non-volatile memory, and stores an operating system (OS), various kinds of control programs and application programs.

The I/F 50 connects various kinds of hardware or networks to the bus 90, and controls the processes performed between the bus 90 and the various hardware and networks.

The LCD 60 is, for example, a user interface that allows a user to visually monitor the operation state of the image forming apparatus 5 via the controller 1000.

The control panel 70 is a user interface such as a keyboard and a mouse, used to input data to the controller 1000.

The dedicated device 80 is a hardware device that implements special functions in the controller 1000, the print engine 300, and the image position detecting device 400. In the case of the print engine 300, the dedicated device 80 functions as a conveying mechanism that conveys a target sheet onto which an image is to be formed and output, or a plotter that forms and outputs an image on the surface of the target sheet.

In the cases of the controller 1000 and the image position detecting device 400, the dedicated device 80 functions as a computation device that performs image processing on an image at high speed. Such a computation device is configured as, for example, an application specific integrated circuit (ASIC).

Further, the dedicated device 80 may include an image reading device such as a sensor that scans the image formed and output on the surface of the sheet is also included.

In such a hardware configuration, programs stored in a memory such as the ROM 30, the HDD 40, or an optical disk are read out into the RAM 20, and the CPU 10 performs computation according to the programs, thereby configuring a software controller.

The software controller configured as described above and a hardware device are combined to configure a function block that realizes the functions of the controller 1000, the print engine 300, and the image position detecting device 400 according to the present embodiment.

Figure 3:
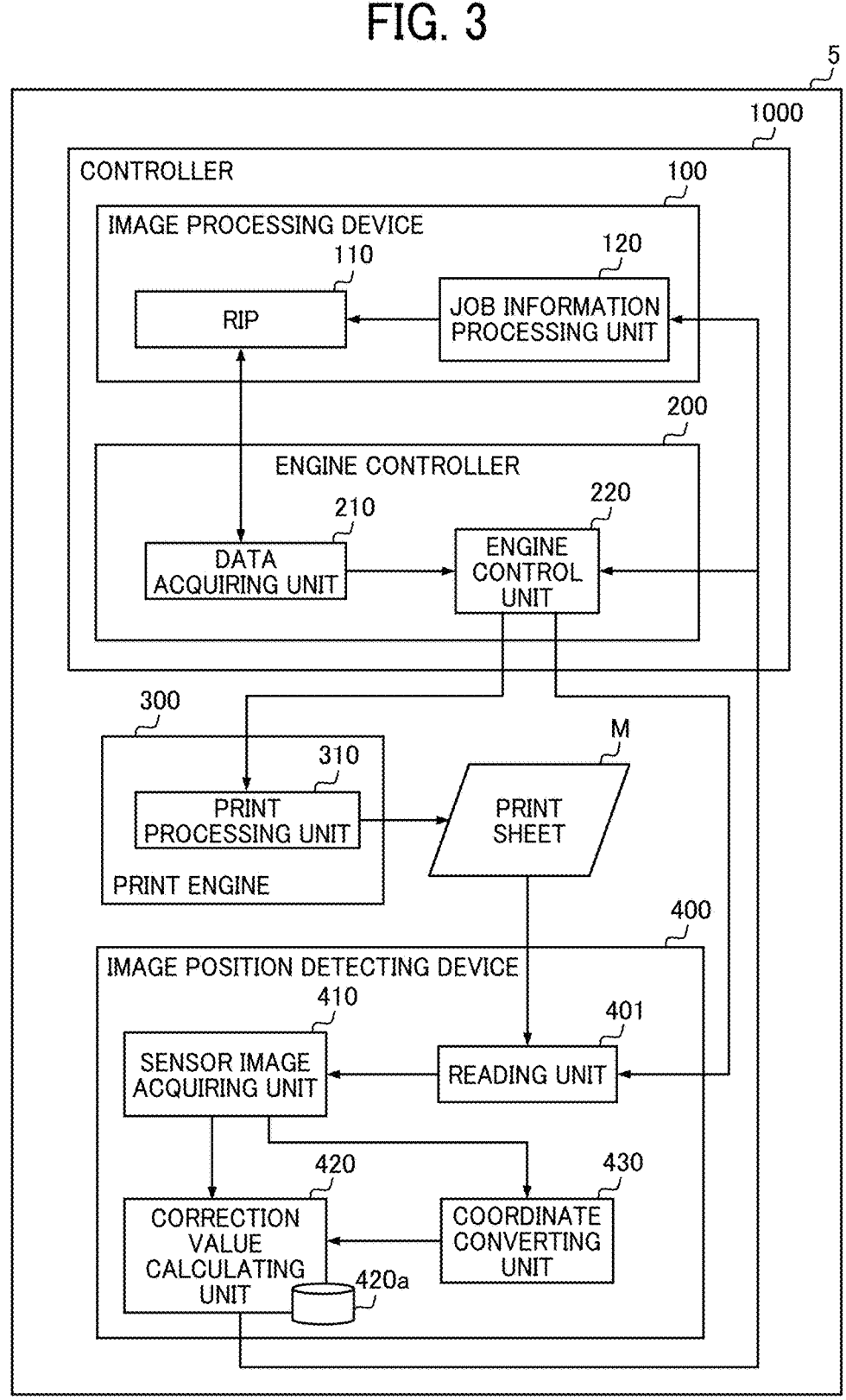
FIG. 3 is a block diagram illustrating a functional configuration of a controller, a print engine, and the image position detecting device, according to an embodiment of this disclosure.

FIG. 3 is a block diagram illustrating a functional configuration of the controller 1000, the print engine 300 and the image position detecting device 400, according to an embodiment of this disclosure.

As illustrated in FIG. 3, the controller 1000 according to the present embodiment includes an image processing device 100 and an engine controller 200.

Further, the print engine 300 includes a print processing unit 310.

Further, the image position detecting device 400 includes a reading unit 401, a sensor image acquiring unit 410, a correction value calculating unit 420, and a coordinate converting unit 430.

The image processing device 100 includes a raster image processor (RIP) 110 and a job information processing unit 120.

Figure 4:
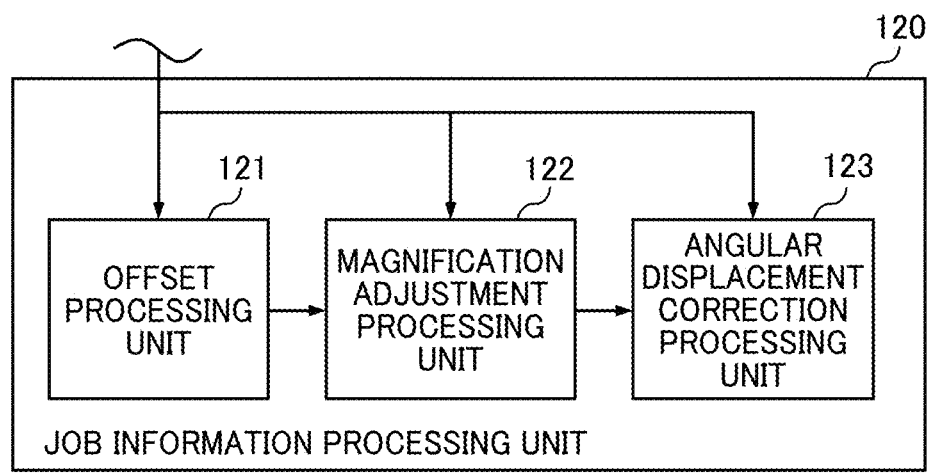
FIG. 4 is a block diagram illustrating a configuration of a job information processing device according to an embodiment of this disclosure.

As illustrated in FIG. 4, the job information processing unit 120 includes an offset processing unit 121, a magnification adjustment processing unit 122, and an angular displacement correction processing unit 123.

The offset processing unit 121, the magnification adjustment processing unit 122, and the angular displacement correction processing unit 123 execute correction processing for correcting the position of the image to be formed on the print sheet M.

Details of the correction processing will be described below.

The performance of the image forming and outputting processes is controlled based on a print job that is to be input from the outside via a network or a print job that is to be generated from image data stored in the controller 1000 by control of an operator. When image forming and outputting processes are performed, the RIP 110 generates bitmap data based on the image data included in the print job, and transmits the generated bitmap data to the engine controller 200.

Upon generation of bitmap data, the RIP 110 generates the bitmap data based on image data included in the print job. The bitmap data generated by the RIP 110 is used by the print engine 300 to perform the image forming and outputting processes. The bitmap data generated by the RIP 110 is information of each of pixels constructing an image to be formed and output.

The bitmap data generated by the RIP 110 is information of each of pixels constructing an image to be formed and output. By contrast, it is generally known that the image data included in a print job is a multi-level image expressed as a multi-level gray scale such as 256-level gray scale per pixel. For this reason, the RIP 110 generates bitmap data of binary CMYK images by converting the image data included in the print job from a multi-level image to a fewer-level image.

The data acquiring unit 210 acquires the print job and the bitmap data sent from the image processing device 100, and sends the acquired bitmap data to the engine control unit 220.

The engine control unit 220 causes the print engine 300 to perform image forming and outputting processes based on the print job and the bitmap data transferred from the data acquiring unit 210. Further, the engine control unit 220 causes the reading unit 401 that functions as a reading device to perform scanning based on the print job transferred from the data acquiring unit 210.

The print processing unit 310 obtains the bitmap data input from the engine controller 200, and functions as an image forming unit that that forms an image on the print sheet M and outputs the print sheet M on which the image is formed. The print processing unit 310 according to the present embodiment is implemented by known electrophotography but may be implemented using other kinds of image forming mechanisms such as ink-jet image forming mechanism.

The reading unit 401 includes line sensors disposed within the image position detecting device 400, along a sheet conveyance passage of the print sheet M output from the print processing unit 310. Based on the control data such as the print job that is input from the engine control unit 220, the reading unit 401 scans the surface of the print sheet M that is conveyed near the reading unit 401 and scans a position detection mark or position detection marks formed on the print sheet M.

Because the scanned image is generated by the reading unit 401 by scanning the surface of the print sheet M that is output with the position detection mark(s) formed on the print sheet M, the scanned image is an image representing an output result by the image forming apparatus 5.

The sensor image acquiring unit 410 acquires the data of the scanned image, which is generated by scanning the surface of the print sheet M using the reading unit 401. The data of the scanned image acquired by the sensor image acquiring unit 410 is input to the correction value calculating unit 420 and the coordinate converting unit 430 together with the print job used when the scanned image is generated by the reading unit 401.

The correction value calculating unit 420 that functions as circuitry to calculate a correction value to correct the position of the image formed on the print sheet M, when the image forming and outputting processes are performed, based on the center coordinates of the position detection marks 7 and the end coordinates of the print sheet M that are included in the scanned image acquired from the sensor image acquiring unit 410.

The correction value calculating unit 420 calculates a correction value C1 based on the scanned image on the first face (i.e., the front face) of the print sheet M. The correction value C1 is a correction value used to adjust the position of the image to be formed on the second face (i.e., the back face) of the print sheet M based on the data of the scanned image and the data of the print job used when the scanned image is generated. Further, the correction value calculating unit 420 calculates a correction value C2 based on the scanned image on the first face (i.e., the front face) of the print sheet M. The correction value C2 is a correction value used to adjust the position of the image to be formed on the first face (i.e., the front face) of the print sheet M.

The correction value C1 and the correction value C2 are transmitted to the job information processing unit 120 and the engine control unit 220, respectively, so as to be used as respective correction values to correct the position of an image to be formed on the print sheet M when the image forming and outputting processes are performed.

The coordinate converting unit 430 converts the center coordinates of the position detection marks 7 and the end coordinates of the print sheet M, both detected by scanning the position detection marks 7 formed on the first face of the print sheet M, into a coordinate system of the first face of the print sheet M used when the image forming and outputting processes are performed to the second face of the print sheet M.

The data of the converted coordinates is output to the correction value calculating unit 420 to be used for calculating the correction value C1. Specific aspects of the coordinate converting process are described below.

With the above-described functional configuration, the processes to correct the position of the image to be formed on the print sheet M is performed in the image forming apparatus 5 according to the present embodiment.

Next, a description is given of the mechanical configuration and functions of the print engine 300 and the image position detecting device 400 in the image forming apparatus 5 and a sheet conveyance passage R of the print sheet M, are described with reference to FIG. 5.

Figure 5:
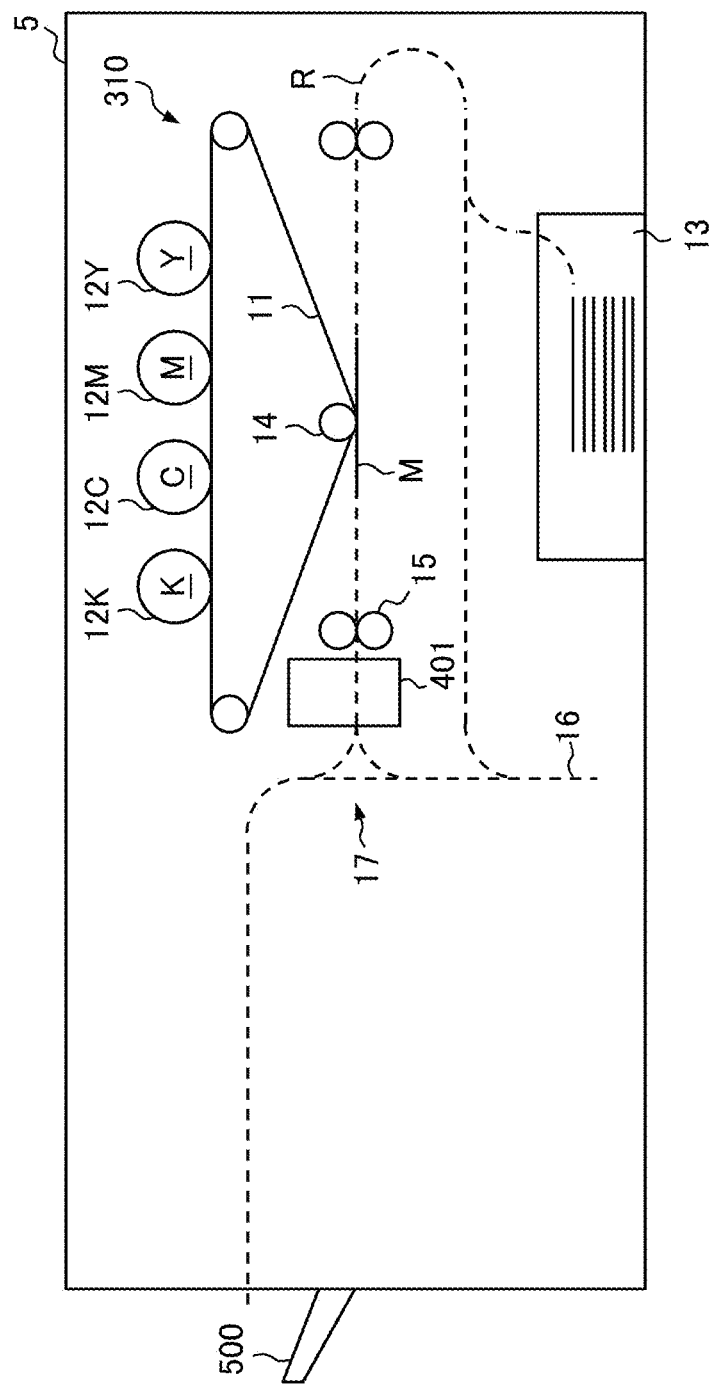
FIG. 5 is a diagram illustrating a mechanical configuration of an image forming apparatus according to an embodiment of this disclosure.

As illustrated in FIG. 5, the print processing unit 310 included in the print engine 300 according to the present embodiment has a configuration in which photoconductor drums 12Y, 12M, 12C and 12K corresponding to four colors are aligned along a conveyance belt 11 that is an endless moving device. Such a type of photoconductor drums is called photoconductor drums of tandem type. Hereinafter, the photoconductor drums 12Y, 12M, 12C and 12K are occasionally referred to as the "photoconductor drum 12", collectively. In other words, multiple photoconductor drums 12Y, 12M, 12C and 12K are arranged along the conveyance belt 11 that functions as an intermediate transfer belt onto which an intermediate transfer image to be transferred to the print sheet M that is fed from a sheet feed tray 13 is formed, in this order from the upstream side of a sheet conveying direction of the conveyance belt 11.

The respective single color images developed with toners as colorants are respectively formed on the surfaces of the photoconductor drums 12Y, 12M, 12C and 12K of four colors and are transferred onto the surface of the conveyance belt 11, so that the respective single color images are superimposed one above the other to form a full color image on the conveyance belt 11. The full color image formed on the conveyance belt 11 as above is transferred by a transfer roller 14 onto the print sheet M that has been conveyed along the sheet conveyance passage R, at a position where the print sheet M with broken lines in FIG. 5 comes closest to the sheet conveyance passage R.

The print sheet M on which the image is formed is further conveyed and the image is fixed to the print sheet M at a fixing device including a fixing roller 15. Thereafter, the print sheet M is conveyed to the reading unit 401 before being conveyed to the outside of the apparatus body of the image forming apparatus 5. Further, in the case of duplex printing, an image is formed on the first face (on the front face), and the print sheet M with the image fixed thereto is conveyed via a sheet reverse passage 16. Therefore, the fixing roller 15 functions as a fixing processing unit that performs a process of fixing the image formed on the print sheet M.

Accordingly, the print sheet M is conveyed to the transfer position of the transfer roller 14 again in the state in which an image is ready to be formed on the second face (the back face) of the print sheet M, in other words, in the state in which the image formed on the conveyance belt 11 is ready to be transferred onto the second face (the back face) of the print sheet M.

The reading unit 401 scans both the first face and the second face of the print sheet M conveyed from the print processing unit 310 in the sheet conveyance passage R of the print sheet M inside the image forming apparatus 5, generates the scanned image, and outputs the scanned image to the sensor image acquiring unit 410 that is configured by an information processing device arranged inside the image position detecting device 400. Then, the print sheet M whose surface has been scanned by the reading unit 401 is further conveyed inside the image forming apparatus 5, and is ejected to a sheet output tray 500.

Details of the scanning process of scanning the first face and the second face of the print sheet M is described below.

Figure 6:
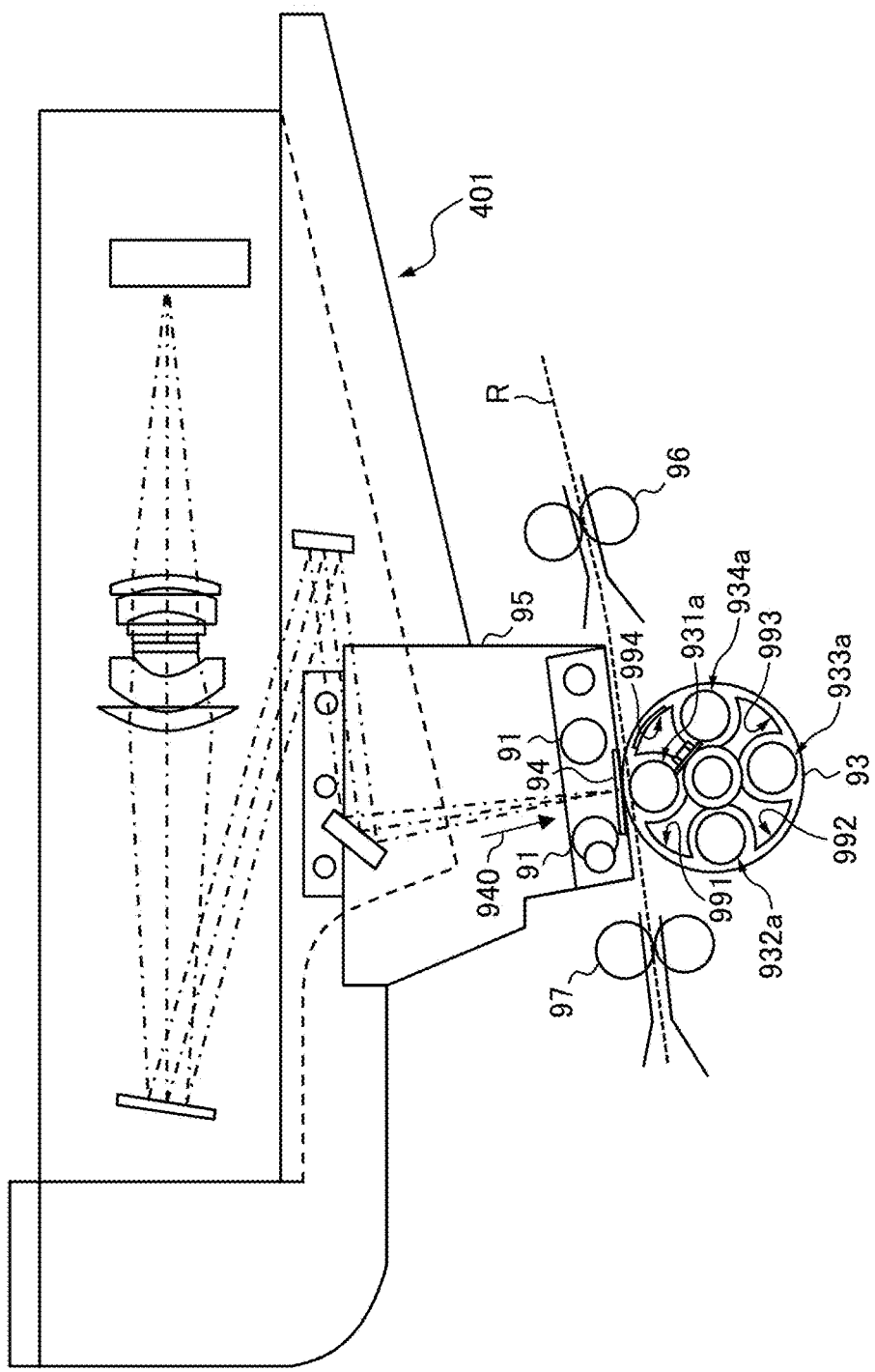
FIG. 6 is a diagram illustrating a main part of the image position detecting device according to an embodiment of this disclosure.
Figure 7:
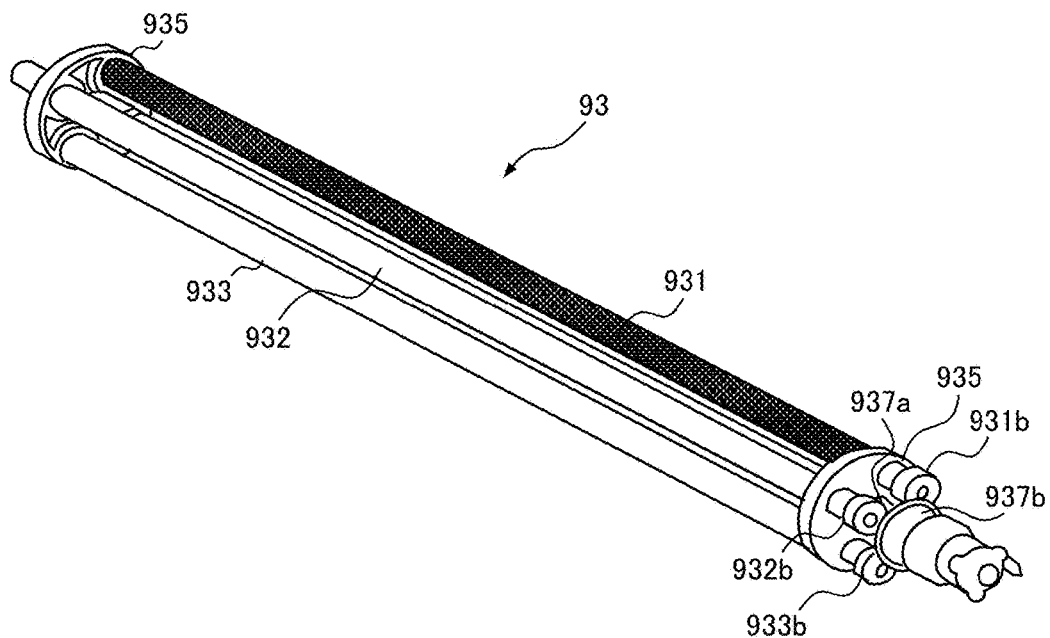
FIG. 7 is a perspective view illustrating an opposing member according to an embodiment of this disclosure.
Figure 8:
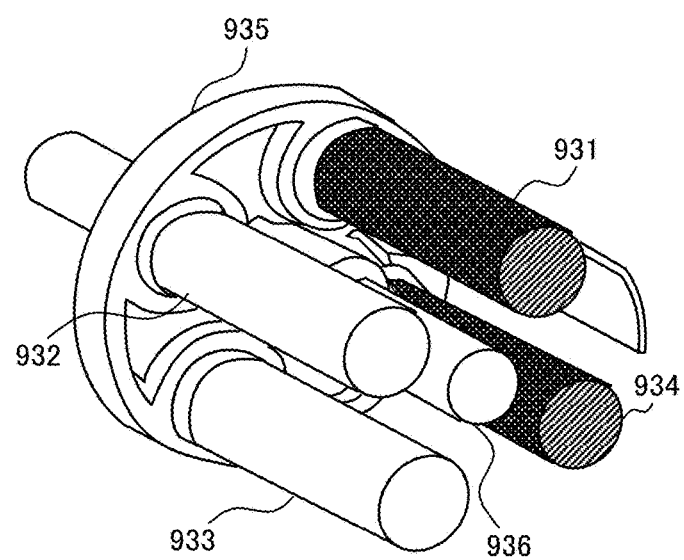
FIG. 8 is an enlarged view illustrating a perspective cross section of the opposing member according to an embodiment of this disclosure.

Next, a description is given of the configuration of the image position detecting device 400 according to the present embodiment, with reference to FIGS. 6 through 8.

FIG. 6 is a diagram illustrating a main part of the image position detecting device 400 according to an embodiment of this disclosure. FIG. 7 is a perspective view illustrating an opposing member 93 according to an embodiment of this disclosure. FIG. 8 is an enlarged view illustrating a perspective cross section of the opposing member 93.

As illustrated in FIG. 5, the reading unit 401 is disposed downstream from the fixing roller 15 in the sheet conveying direction of the print sheet M or is disposed upstream from a branch 17 in the sheet conveying direction of the print sheet M. The branch 17 functions as a branching portion at which whether the print sheet M is output to the outside of the apparatus body of the image forming apparatus 5 or be conveyed to the sheet reverse passage 16.

The reading unit 401 optically scans an image such as the position detection marks 7 formed on the print sheet M, and generates a scanned image. Then, the correction value calculating unit 420 calculates the correction value C1 and the correction value C2 based on the generated scanned image. Accordingly, the color of the opposing member 93 and the gap between the opposing member 93 and an exposure glass 94 are changed according to the thickness and color of the print sheet M, in the image position detecting device 400 according to the present embodiment.

As illustrated in FIG. 6, the image position detecting device 400 includes illumination light sources 91, the reading unit 401, the opposing member 93, the exposure glass 94 and a support 95.

The illumination light sources 91 are disposed on an image forming surface on which an image is formed on the print sheet M conveyed to the image position detecting device 400. Through the entire part of the sheet conveyance passage R of the print sheet M, light is emitted to a scanning position at which the image formed on the print sheet M is scanned, along a part of the sheet conveyance passage R through which the print sheet M passes in the image position detecting device 400.

The reading unit 401 may have a configuration including an image sensor having a reflector, an imaging forming lens and an image pick up device, or a line sensor in which image pick up devices are aligned. The reading unit 401 scans the image formed on the image forming surface of the print sheet M by the image pick up devices. Further, when the print sheet M is not at the scanning position, the reading unit 401 scans outer circumferential surfaces 931a, 932a, 933a and 934a of the opposing member 93 and a reference plane member of the opposing member 93. Then, the reading unit 401 generates the scanned image based on a light receiving amount received by the image pickup device.

The opposing member 93 is disposed on the reverse side of the image forming surface on which the image is formed on the print sheet M conveyed to the reading unit 401.

As illustrated in FIGS. 7 and 8, rollers 931, 932, 933 and 934 are rotatably held by a roller bracket 935. The rollers 931, 932, 933, and 934 are rotary bodies having the outer circumferential surfaces 931a, 932a, 933a and 934a, each of which having a reference plane that is curved outwardly into a protruding shape. The rollers 931, 932, 933 and 934 rotate individually and separately from the roller bracket 935.

Further, the roller bracket 935 is fastened to a roller bracket shaft 936. Along with rotations of the roller bracket shaft 936, the roller bracket 935 rotates while holding the rollers 931, 932, 933 and 934. Accordingly, by selectively switching the rollers 931, 932, 933 and 934, the outer circumferential surfaces 931a, 932a, 933a and 934a are disposed at respective predetermined scanning position facing the exposure glass 94 with a gap through which the print sheet M can pass.

It is to be noted that, out of the outer circumferential surfaces 931a, 932a, 933a and 934a, the scanning position is set to a position that is, for example, closest to the exposure glass 94, on the outer circumferential surface of the roller that is disposed facing the exposure glass 94.

Further, the scanning position may be set, for example, from a position closest to the exposure glass 94 on the outer circumferential surface of the roller disposed facing the exposure glass 94, to a position corresponding to the thickness of the print sheet M, close to the exposure glass 94.

The exposure glass 94 includes a light transmitting member and is disposed at a position facing the image forming surface of the print sheet M after being conveyed to the scanning position.

The support 95 is a member to which the illumination light sources 91 and the reading unit 401 are fixed. Through the sheet conveyance passage R of the print sheet M, a part of the sheet conveyance passage R of the print sheet M, through which the print sheet M passes the reading unit 401, is separated from an upstream portion and a downstream sheet conveyance passage R and is supported by the support 95.

A sheet conveying roller 96 is disposed on an upstream side of the sheet conveyance passage R and a sheet conveying roller 97 is disposed on a downstream side of the sheet conveyance passage R, along a part other than the part of the sheet conveyance passage R, through which the print sheet M passes the reading unit 401.

As the print sheet M is conveyed, the reading unit 401 scans the image forming surface from a side indicted by arrow 940, through the exposure glass 94. The outer circumferential surface 931a of the roller 931 is disposed at a position facing the exposure glass 94 and rotates along with conveyance of the print sheet M. As described above, the roller 931 has a function of conveying the print sheet M. Therefore, even when a narrow gap through which the print sheet M does not move, paper jams are less likely to occur.

The rollers 931, 932, 933, and 934 are rollers having at least one of color and diameter is different from each other. For example, the roller 931 is a black roller having a regular diameter, the roller 932 is a white roller having a smaller diameter, the roller 933 is a white roller having a regular diameter, and the roller 934 is a black roller having a small diameter.

Therefore, by switching the rollers according to the color of the print sheet M, the boundary between the print sheet M and the roller in the scanned image can be easily recognized. Further, the diameter of the roller can be changed by changing the roller depending on the thickness of the print sheet M or whether a shading process is performed or not. Further, by changing the rollers, the size of the gap between the print sheet M and the opposing member 93 can be changed.

Further, a drive unit may be provided to rotate the rollers 931, 932, 933 and 934. According to this configuration, even when the gap between the exposure glass 94 and the roller out of the rollers 931, 932, 933 and 934, disposed facing the exposure glass 94 becomes smaller, a recording medium P can be conveyed.

FIG. 7 is a perspective view illustrating the opposing member 93 that can drive and rotate the rollers 931, 932, 933 and 934. FIG. 8 is an enlarged view illustrating a perspective cross section of the opposing member 93 of FIG. 7.

Roller gears 931b, 932b, 933b and 934b are mounted on the rollers 931, 932, 933 and 934, respectively. A roller drive gear 937a that has the same center of rotation as the roller bracket 935 is drivingly connected to the roller gears 931b, 932b, 933b and 934b.

Accordingly, as the roller drive gear 937a rotates, the rollers 931, 932, 933 and 934 drivingly rotate via the roller gears 931b, 932b, 933b and 934b. A roller drive pulley 937b is integrally mounted on the roller drive gear 937a and is drivingly coupled via respective pulleys that drive the sheet conveying rollers 96 and 97 and the drive belt. This drive system has a function as a rotating and driving unit to rotate the rollers 931, 932, 933 and 934.

As the drive pulley rotates, the pulley that rotate the sheet conveying roller 96, the pulley that rotate the sheet conveying roller 97, and the roller drive pulley 937b start driving and rotating simultaneously, via the drive belt. As described above, at the same time the sheet conveying rollers 96 and 97 start rotating, the rollers 931, 932, 933 and 934 rotate via the roller drive gear 937a and the roller gears 931b, 932b, 933b and 934b. At this time, the surface of the roller 931 disposed at a position facing the exposure glass 94 moves in the same direction as the sheet conveying direction of the print sheet M.

It is to be noted that the engine control unit 220 controls a driving and rotating position of the roller bracket 935 to selectively switch the rollers 931, 932, 933 and 934, the reference plate members 991, 992 and 993 and a guide 994, so as to be disposed at the scanning position.

Figure 9:
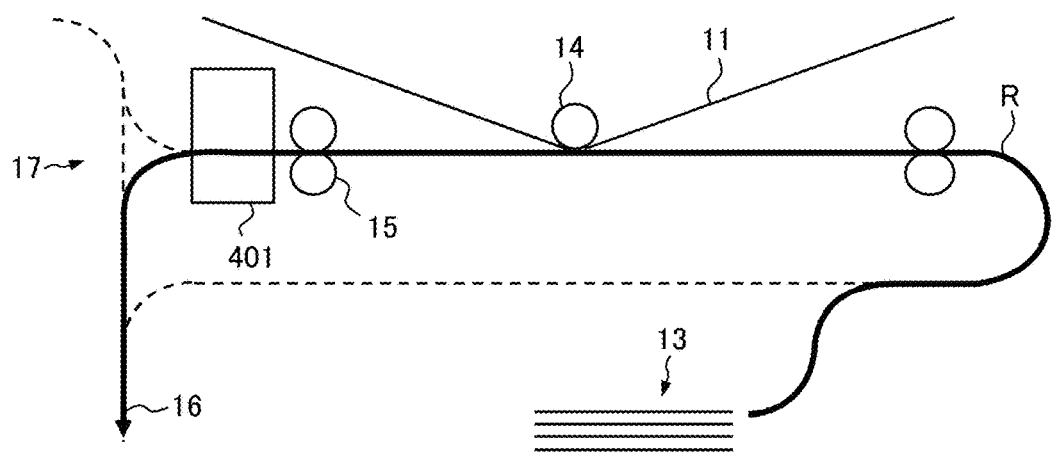
FIG. 9 is diagram illustrating a sheet conveyance passage of a recording medium in printing of a first face of the recording medium according to an embodiment of this disclosure.

Next, a description is given of the sheet conveyance passage R of the print sheet M when printing the first face of the print sheet M, with reference to FIG. 9.

FIG. 9 is diagram illustrating the sheet conveyance passage R of the print sheet M when printing an image on the first face of the print sheet M according to an embodiment of this disclosure.

When forming an image on the first face of the print sheet M, the print sheet M is conveyed through the sheet conveyance passage R of the print sheet M, along a sheet conveyance passage indicated by arrow in FIG. 9, from the sheet feed tray 13 toward the conveyance belt 11. Then, according to the function of the transfer roller 14, the image formed on the conveyance belt 11 is transferred onto the first face (the front face) of the print sheet M.

The print sheet M on which the image is formed is conveyed to the fixing device, where the image is fixed to the print sheet M by the fixing roller 15. The fixing roller 15 fixes the image to the print sheet M by application of heat and pressure to the print sheet M.

Figure 10:
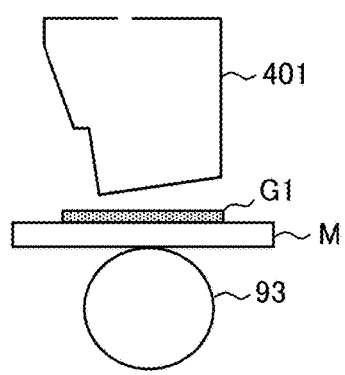
FIG. 10 is a diagram illustrating a state in which a position detection mark printed on the first face of the recording medium is scanned, according to an embodiment of this disclosure.

When the image is fixed to the print sheet M, the print sheet M is conveyed to the reading unit 401. Then, as illustrated in FIG. 10, an image G1 formed on the first face of the print sheet M is scanned by the reading unit 401. After passing through the reading unit 401, the print sheet M is then conveyed to the sheet reverse passage 16.

Figure 11:
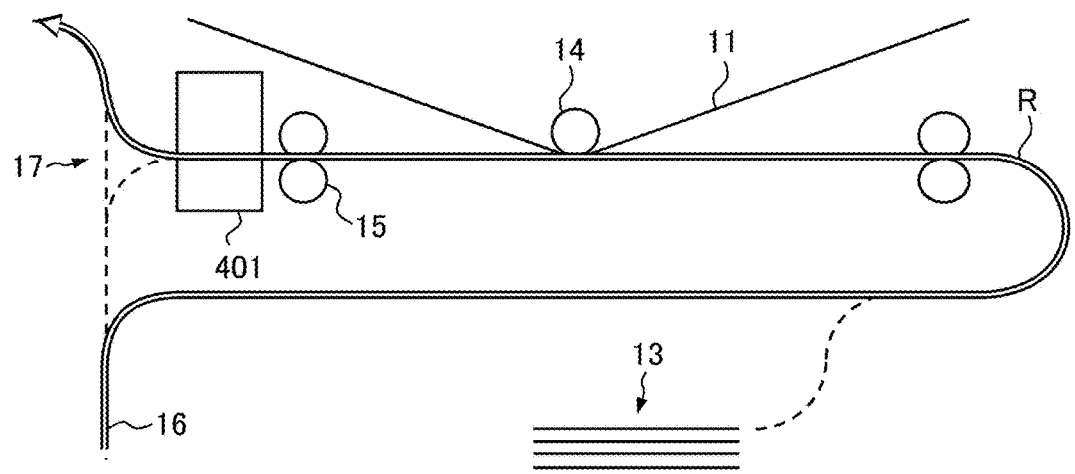
FIG. 11 is a diagram illustrating a sheet conveyance passage of the recording medium in printing of a second face of the recording medium according to an embodiment of this disclosure.

Next, a description is given of the sheet conveyance passage R of the print sheet M when printing the second face of the print sheet M, with reference to FIG. 11.

FIG. 11 is a diagram illustrating the sheet conveyance passage R of the print sheet M when printing an image on the second face of the print sheet M, according to an embodiment of this disclosure.

When forming an image on the second face of the print sheet M, the print sheet M is conveyed through the sheet conveyance passage R of the print sheet M, along a sheet conveyance passage indicated by arrow in FIG. 11, from the sheet reverse passage 16 toward the conveyance belt 11. Then, according to the function of the transfer roller 14, the image formed on the conveyance belt 11 is transferred onto the second face (the back face) of the print sheet M.

The print sheet M onto which the image is transferred is conveyed to the fixing device, where the image is fixed to the print sheet M by the fixing roller 15. Then, the print sheet M is conveyed toward the sheet output tray 500.

Figure 12:
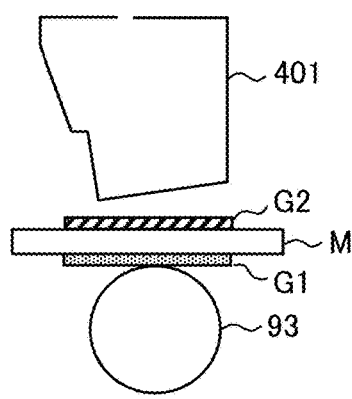
FIG. 12 is a diagram illustrating a state in which a position detection mark printed on the second face of the recording medium is scanned, according to an embodiment of this disclosure.

It is to be noted that, when the image formed on the second face of the print sheet M is scanned, the print sheet M is conveyed to the reading unit 401 after the image is fixed to the print sheet M. By so doing, the reading unit 401 scans an image G2 formed on the print sheet M, as illustrated in FIG. 12.

Thus, in the image forming apparatus 5 according to the present embodiment, by providing the reading unit 401 between the fixing roller 15 and the branch 17, even when performing the duplex printing, the images formed on both sides, i.e., the first and second faces, of the print sheet M are scanned without taking the print sheet M to the outside of the image forming apparatus 5.

Figure 13:
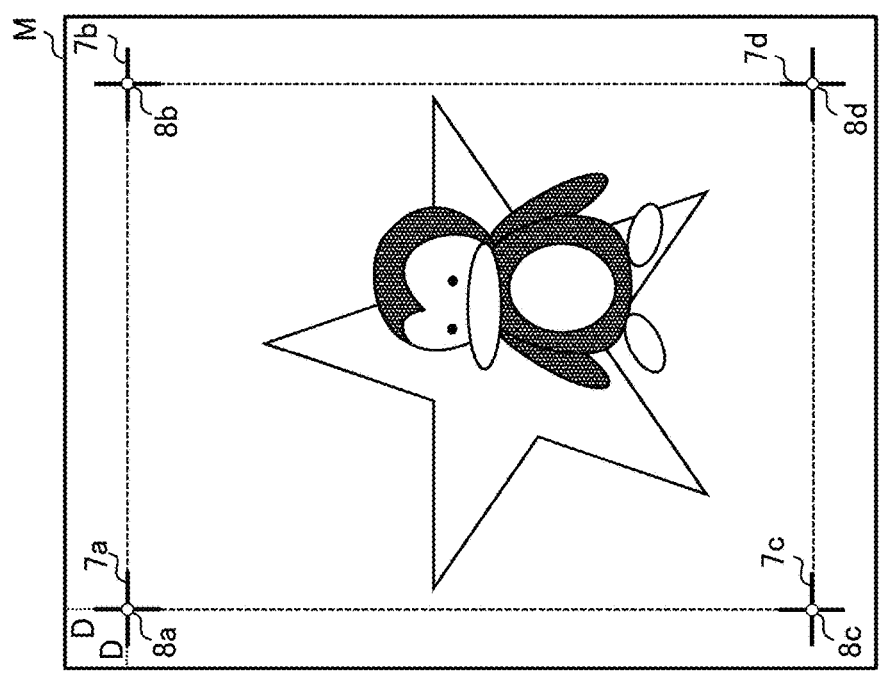
FIG. 13 is a diagram illustrating a configuration of the position detection mark according to an embodiment of this disclosure.

Next, a description is given of the position detection marks 7 to be formed on the print sheet M for detecting the position of an image formed on the print sheet M, with reference to FIG. 13.

FIG. 13 is a diagram illustrating a configuration of the position detection marks 7 according to the present embodiment of this disclosure.

In the present embodiment, the position detection marks 7 are formed, together with an image GP that is generated through the image forming and outputting processes, at respective positions separated from respective end portions of the print sheet M by a predetermined distance D to the center of the print sheet M.

More specifically, the position detection marks 7 includes position detection marks 7a, 7b, 7c and 7d are formed at respective positions separated from the respective end portions in the main scanning and sub-scanning directions of the print sheet M by the predetermined distance D. Then, by scanning the position detection marks 7a, 7b, 7c and 7d, respective coordinates of positions 8a, 8b, 8c and 8d are obtained.

It is to be noted that each of the positions 8 (i.e., the positions 8a, 8b, 8c and 8d) correspond to the center coordinates of the position detection marks 7 (i.e., the position detection marks 7a, 7b, 7c and 7d).

The correction value calculating unit 420 and the coordinate converting unit 430 perform the processes to correct the position of the image GP formed on the print sheet M based on the coordinates of the positions 8a, 8b, 8c and 8d and the coordinates of four end corners of the print sheet M.

Next, a description is given of how to calculate a correction value for correcting the position of the image formed on the print sheet M, with reference to FIGS. 14 through 17.

FIGS. 14 through 17 are diagrams illustrating respective states in which the correction value C1 is calculated to adjust the position of an image formed on the print sheet M according to the present embodiment of this disclosure.

Figure 15:
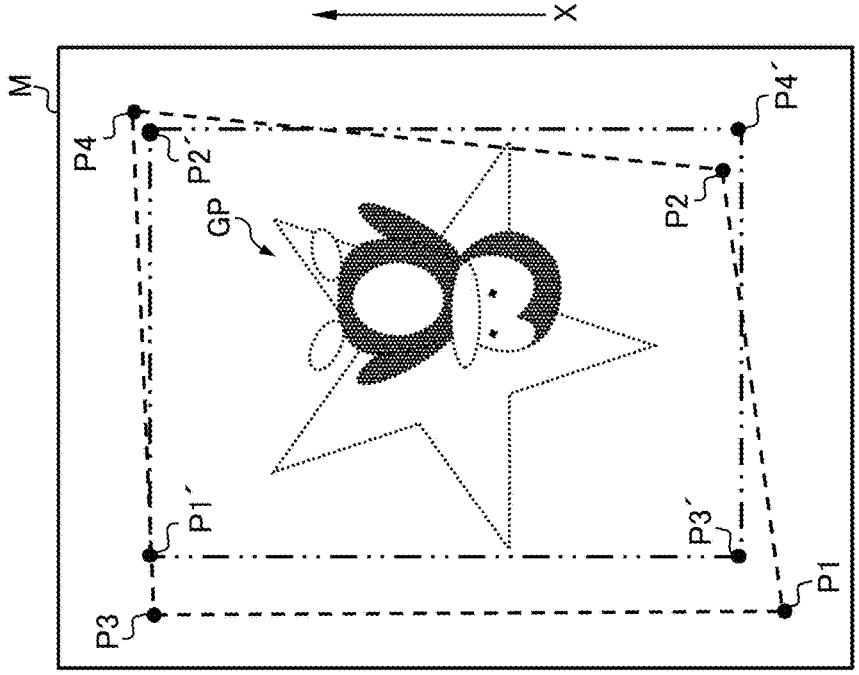
FIG. 15 is a diagram illustrating another state in which a correction value to adjust the position of the image is calculated, according to an embodiment of this disclosure.
Figure 16:
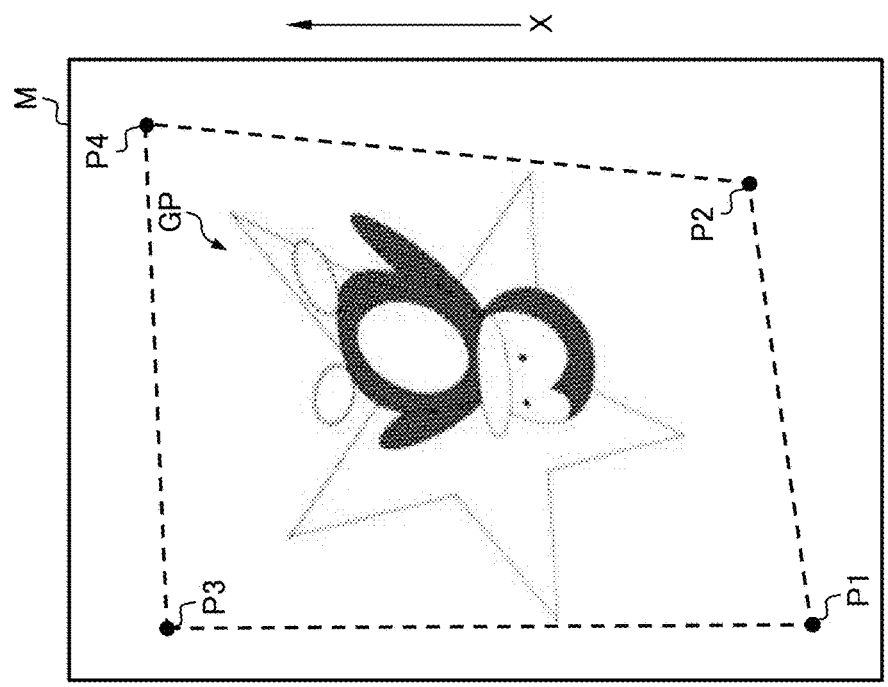
FIG. 16 is a diagram illustrating yet another state in which a correction value to adjust the position of the image is calculated, according to an embodiment of this disclosure.

It is to be noted that an image GP illustrated in FIGS. 15 through 17 is generated when assuming that the first face of the print sheet M is viewed through the second face of the print sheet M and the outline of the image GP is depicted by a broken line, and therefore the image GP may be or may not be illustrated on an actual second face of the sheet print M.

The correction value C1 is the first correction value to adjust the position of the image to be formed on the second face of the print sheet M, so as to correspond to the positions 8a, 8b, 8c and 8d based on the scanning result of the position detection marks 7 on the first face of the print sheet M. Therefore, when calculating the correction value C1, the coordinate converting unit 430 converts the coordinates of the positions 8a, 8b, 8c and 8d on the second face of the print sheet M, of the position detection marks 7a, 7b, 7c and 7d formed on the first face of the print sheet M, such that the position of the image formed on the second face of the print sheet M is located at the same position as the image formed on the first face of the print sheet M when the image formed on the first face is viewed from the second face through the print sheet M.

FIG. 13 illustrates position coordinates P1, P2, P3, and P4 that are the coordinates of the positions 8a, 8b, 8c and 8d on the first face of the print sheet M.

As described above, when the correction value C1 is calculated, the coordinates (i.e., the position coordinates P1, P2, P3 and P4) of the positions 8a, 8b, 8c and 8d on the first face of the print sheet M are converted to the positions on the second face of the print sheet M, such that the position of the image formed on the second face of the print sheet M is located at the same position as the image formed on the first face of the print sheet M when the image formed on the first face is viewed from the second face through the print sheet M, as described above.

It is to be noted that the position coordinates P1, P2, P3, and P4 are position coordinates that indicate the positions of the position detection marks 7a, 7b, 7c and 7d formed on the print sheet M based on the position 8a to the position coordinate P1, the position 8b to the position coordinate P2, the position 8c to the position coordinate P3, the position 8d to the position coordinate P4, and the respectively corresponding end portions of the print sheet M.

Figure 14:
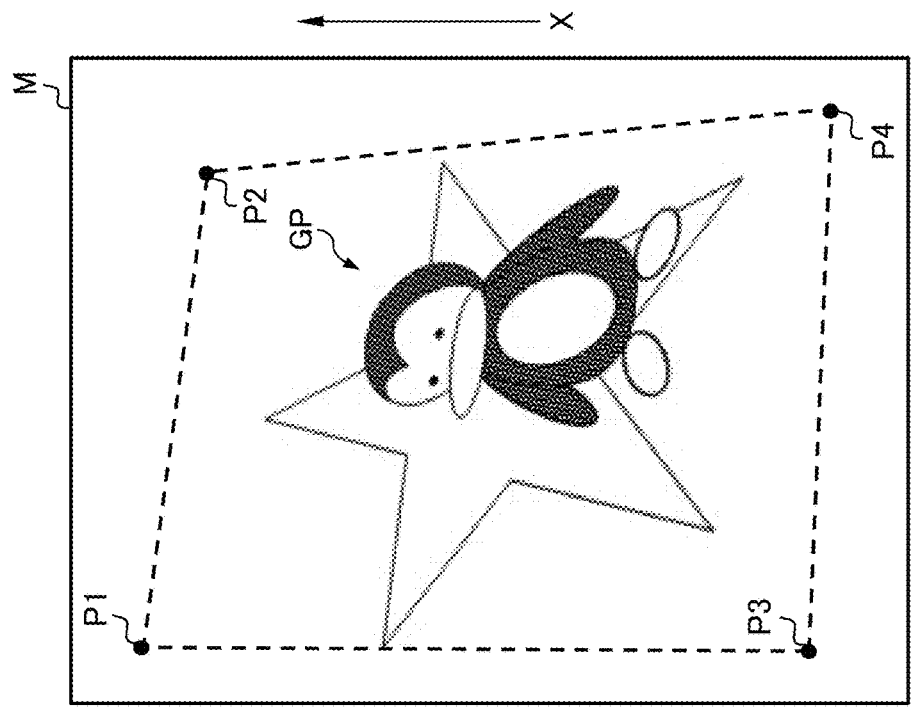
FIG. 14 is a diagram illustrating a state in which a correction value to adjust the position of the image is calculated, according to an embodiment of this disclosure.

FIG. 14 illustrates the position coordinates P1, P2, P3 and P4 on the print sheet M after the coordinates are converted.

The coordinate converting unit 430 converts the coordinates of the position coordinates P1, P2, P3 and P4 in FIG. 13 to be located at positions reversed in the main scanning direction of the print sheet M, in other words, in a direction perpendicular to a sheet conveying direction X of the print sheet M.

Then, the correction value calculating unit 420 calculates the correction value C1 to adjust the position of the image formed on the second face of the print sheet M after the correction value C2 is applied.

As illustrated in FIG. 16, the correction value calculating unit 420 calculates the correction value C1 used to adjust the position of the image such that the ideal position coordinates P1', P2', P3' and P4' of the image formed on the second face of the print sheet M after the correction value C2 is applied correspond to the position coordinates P3, P4, P1 and P2, respectively.

That is, the correction value calculating unit 420 calculates amounts of movement of the ideal position coordinate P1' to the position coordinate P3, the ideal position coordinate P2' to the position coordinate P4, the ideal position coordinate P3' to the position coordinate P1, and the ideal position coordinate P4' to the position coordinate P2, respectively, of the image on the second face of the print sheet M, as the correction value C1.

FIG. 17 illustrates ideal position coordinates P1", P2", P3" and P4" that are coordinates on the print sheet M after the ideal position coordinates P1', P2', P3' and P4' in FIG. 16 are moved by the correction value C1.

By applying the correction value C1 calculated by the correction value calculating unit 420 to the position coordinates P1', P2', P3' and P4' illustrated in FIG. 16, the image corrected to the ideal position coordinates P1", P2", P3" and P4" are obtained.

Figure 19:
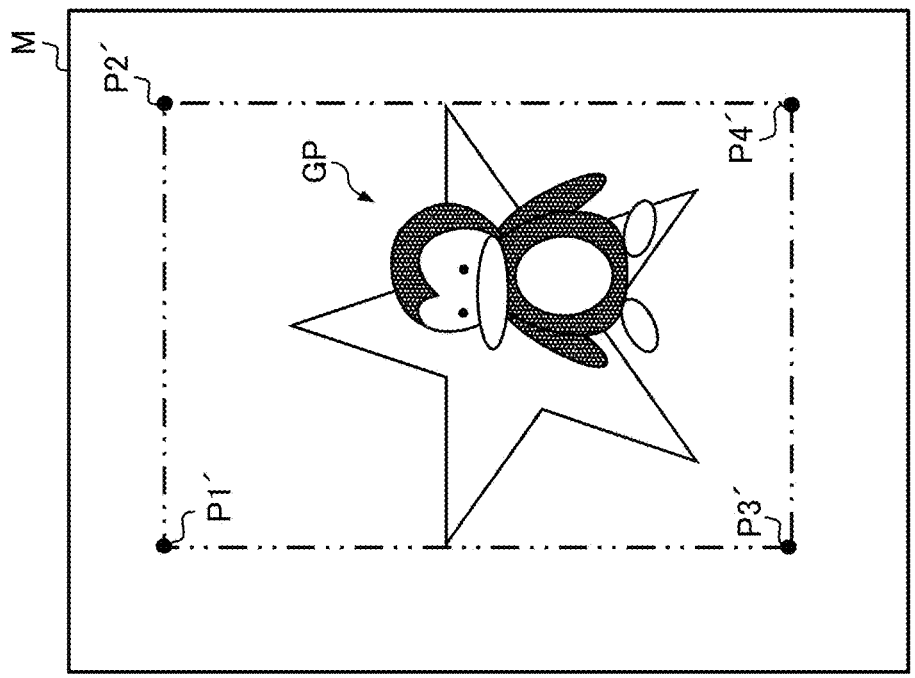
FIG. 19 is a diagram illustrating yet another state in which a correction value to adjust the position of the image is calculated, according to an embodiment of this disclosure.
Figure 20:
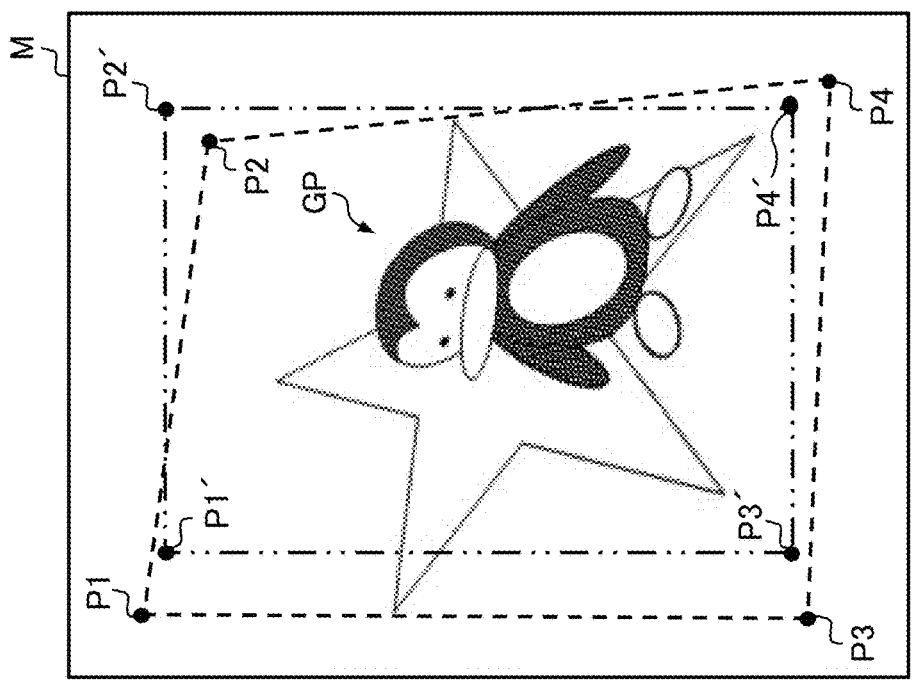
FIG. 20 is a diagram illustrating yet another state in which a correction value to adjust the position of the image is calculated, according to an embodiment of this disclosure.

Next, a description is given of how to calculate a correction value for correcting the position of the image formed on the print sheet M to the ideal position, with reference to FIGS. 18 through 20.

FIGS. 18 through 20 are diagrams illustrating respective states in which the correction value C2 is calculated to adjust the position of an image formed on the print sheet M to the ideal position, according to the present embodiment of this disclosure.

It is to be noted that the correction value C2 is a second correction value used to adjust the position of the image formed on the first face of the printing paper M to the ideal position.

The scanning results of the print sheet M by the reading unit 401 are sent to the sensor image acquiring unit 410. The sensor image acquiring unit 410 acquires the scanned image including the position detection marks 7a, 7b, 7c and 7d. The correction value calculating unit 420 acquires the scanned image from the sensor image acquiring unit 410, and acquires the coordinates of the positions 8a, 8b, 8c and 8d on the print sheet M and the coordinates of the end portions of the print sheet M.

FIG. 18 illustrates position coordinates P1, P2, P3 and P4 that indicate the positions 8a, 8b, 8c and 8d on the print sheet M.

The position coordinates P1, P2, P3 and P4 correspond to the positions 8a, 8b, 8c and 8d at the end portions of the print sheet M, respectively. The position coordinates P1, P2, P3 and P4 indicate the positions of the position detection marks 7a, 7b, 7c and 7d formed on the print sheet M based on the coordinates at the end portions of the print sheet M.

Depending on the operation state of the image forming apparatus 5 and the cutting shape of the print sheet M, the positions 8a, 8b, 8c and 8d on the print sheet M are likely to be different from ideal position coordinates P1', P2', P3' and 4' at which the positions 8a, 8b, 8c and 8d are originally to be formed on the print sheet M, as illustrated in FIG. 19.

Here, the ideal position at which an image is to be originally formed on the print sheet M is a position that is specified based on data for setting a margin from an end portion of the print sheet M in a print job.

The correction value calculating unit 420 calculates respective amounts of movement of the position 8a from the position coordinate P1 to the ideal position coordinate P1', the position 8b from the position coordinate P2 to the ideal position coordinate P2', the position 8c from the position coordinate P3 to the ideal position coordinate P3' and the position 8d from the position coordinate P4 to the ideal position coordinate P4', as the correction value C2.

FIG. 20 illustrates the ideal position coordinates P1', P2', P3' and P4' that are the coordinates formed at positions moved from the position coordinates P1, P2, P3 and P4 of FIG. 18 by the correction value C2.

By applying the correction value C2 calculated by the correction value calculating unit 420 to the position coordinates P1, P2, P3 and P4 in FIG. 18, a corrected image corrected to the ideal position coordinates P1', P2', P3' and P4' is obtained.

Figure 21:
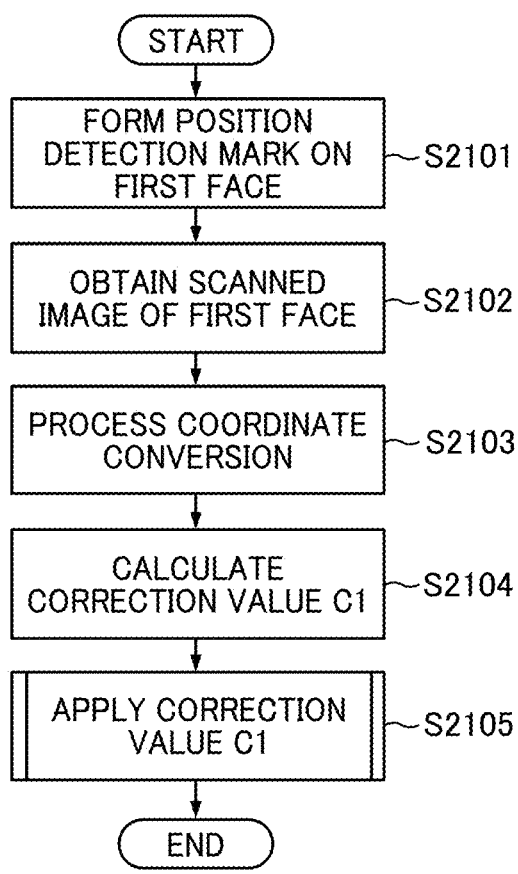
FIG. 21 is a flowchart of processes in which a correction value to adjust the position of the image is calculated, according to an embodiment of this disclosure.

Next, a description is given of a flow of calculating processes of the correction values for correcting the position of the image formed on the print sheet M, according to the present embodiment of this disclosure, with reference to FIG. 21.

FIG. 21 is a flowchart of processes in which correction values used for correcting the position of an image formed on the print sheet M, according to an embodiment of this disclosure.

In the present embodiment, an operation mode to perform correction of the position of an image to be formed on the print sheet M is selected by a user of the image forming apparatus 5. Then, a job to perform the operation mode (i.e., an image position adjusting mode) in which the controller 1000 performs correction of the position of the image to be formed on the print sheet M is input to the controller 1000. That is, the controller 1000 treats the image position adjusting mode as one of the print jobs.

As the print job to perform the image position adjusting mode to the controller 1000, the job information processing unit 120 causes the RIP 110 to generate bitmap data for forming the image GP that is a target image to which the image forming and outputting processes are performed and the position detection marks 7 (i.e., the position detection marks 7a, 7b, 7c and 7d) on the print sheet M.

As illustrated in FIG. 13, the RIP 110 generates bitmap data including the target image to which the image forming and outputting processes are performed and the position detection marks 7 (i.e., the position detection marks 7a, 7b, 7c and 7d) on the print sheet M.

The engine control unit 220 receives the bitmap data generated by the RIP 110 via the data acquiring unit 210, and inputs the bitmap data to the print processing unit 310 to perform image formation of the print sheet M (step S2101).

After the image is formed on the print sheet M, the engine control unit 220 conveys the print sheet M to the reading unit 401 so that the surface of the print sheet M having the position detection marks 7 thereon is scanned by the reading unit 401. The reading unit 401 scans the print sheet M and generates the scanned image. The sensor image acquiring unit 410 obtains the scanned image including the position detection marks 7 (step S2102).

It is to be noted that the scanned image generated in step S2102 is used as the scanned image to calculate the correction value C1.

The coordinate converting unit 430 performs a process to convert the coordinates as described above, based on the coordinates of the position detection marks 7 and the end coordinates of the end portions of the print sheet M that are included in the scanned image of the first face of the print sheet M obtained in step S2102 (step S2103).

Then, based on the coordinates of the position detection marks 7 included in the scanned image of the first face of the print sheet M and the end coordinates of the end portions of the print sheet M, the correction value calculating unit 420 calculates the correction value C1 to be used to adjust the position of the image to be formed on the first face of the print sheet M and the position of the image to be formed on the second face of the print sheet M, as described above (step S2104).

It is to be noted that, in the image forming apparatus 5, correction limit values, which indicates a range of the correction values used to adjust the position of the image on the print sheet M when the image is formed on the print sheet M, is specified.

The correction limit values include an upper limit value and a lower limit value, and are used to adjust the position of the image for image formation when the correction value C1 calculated by the correction value calculating unit 420 is not applied for the image formation due to the operation state and performance of the image forming apparatus 5 and the size and characteristics of the print sheet M.

Figure 22:
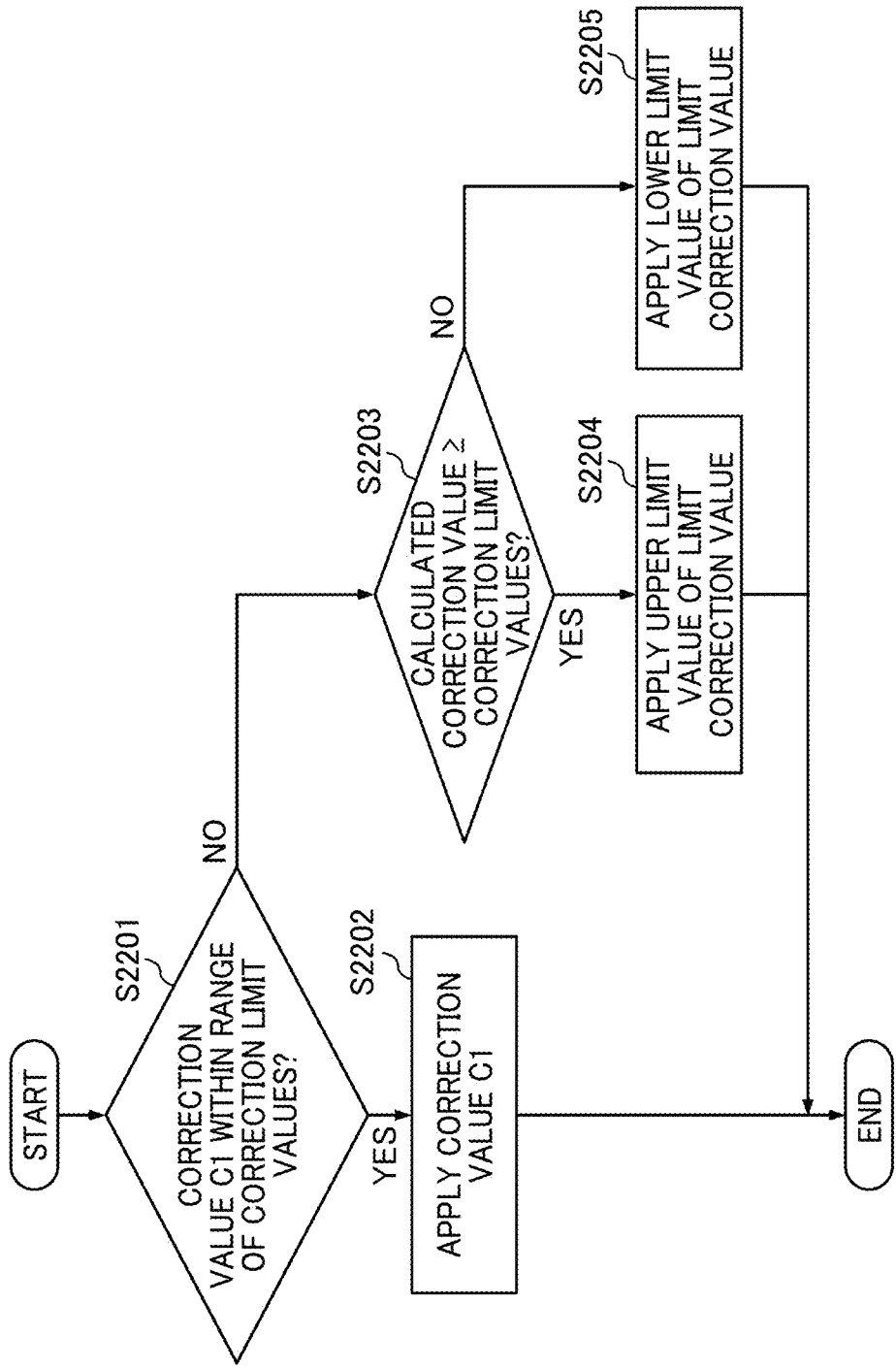
FIG. 22 is a flowchart of processes in which the correction value to be used for image formation is determined, according to an embodiment of this disclosure.

The correction value calculating unit 420 determines whether the correction value C1 calculated by the correction value calculating unit 420 or any one of the correction limit values are used, according to the flowchart of FIG. 22.

FIG. 22 is a flowchart of a flow of processes to determine the correction value to be used in image formation, according to the present embodiment of this disclosure.

It is to be noted that the flowchart of FIG. 22 is executed as processes to apply or use the correction value in step S2105.

The correction value calculating unit 420 determines whether or not the correction value C1 is within the range of the correction limit values (step S2201).

When it is determined that the correction value C1 calculated by the correction value calculating unit 420 is within the range of the correction limit values (YES in step S2201), the correction value calculating unit 420 sends the calculated correction value C1 to the job information processing unit 120 and the engine control unit 220 (step S2202).

When it is determined that the correction value C1 calculated by the correction value calculating unit 420 is not within the range of the correction limit values (NO in step S2201), the correction value calculating unit 420 determines whether or not the calculated correction value C1 is equal to or greater than the limited correction value (step S2203).

When the calculated correction value C1 is equal to or greater than the correction limit values (YES in step S2203), the correction value calculating unit 420 sends the upper limit value of the limited correction value to the job information processing unit 120 and the engine control unit 220 (step S2204).

By contrast, when the calculated correction value C1 is not equal to or greater than the correction limit values (NO in step S2203), the correction value C1 calculated by the correction value calculating unit 420 is a value below the correction limit values. Therefore, when the calculated correction value C1 is not equal to or greater than the correction limit values, the correction value calculating unit 420 sends the lower limit value of the correction limit values to the job information processing unit 120 and the engine control unit 220 (step S2204).

The job information processing unit 120 and the engine control unit 220 adjust the position of the image on the second face of the print sheet M based on the correction value C1 or the correction limit values sent from the correction value calculating unit 420, and completes the present process.

By performing this process, the position of the image formed on the second face of the print sheet M is adjusted to the position corresponding to the ideal position of the image of the first face of the print sheet M.

As described above, in the present embodiment, by adjusting the position of the image to be formed on the second face of the print sheet M based on the position of the image to be formed on the first face of the print sheet M, the relative position of the images to be formed on both sides (i.e., the first face and the second face) of the print sheet M is adjusted.

Further, since the reading unit 401 that scans the image to be formed on the first face of the print sheet M is provided inside the image forming apparatus 5, the print result of the front face of the print sheet M is applied to the back face of the same print sheet M when the duplex printing is performed, so that the position of the image to be formed on the back face of the print sheet M is adjusted.

It is to be noted that the position of the image to be formed on the first face of the print sheet M is also adjusted to the ideal position, based on the scanned image acquired in step S2102.

Figure 23:
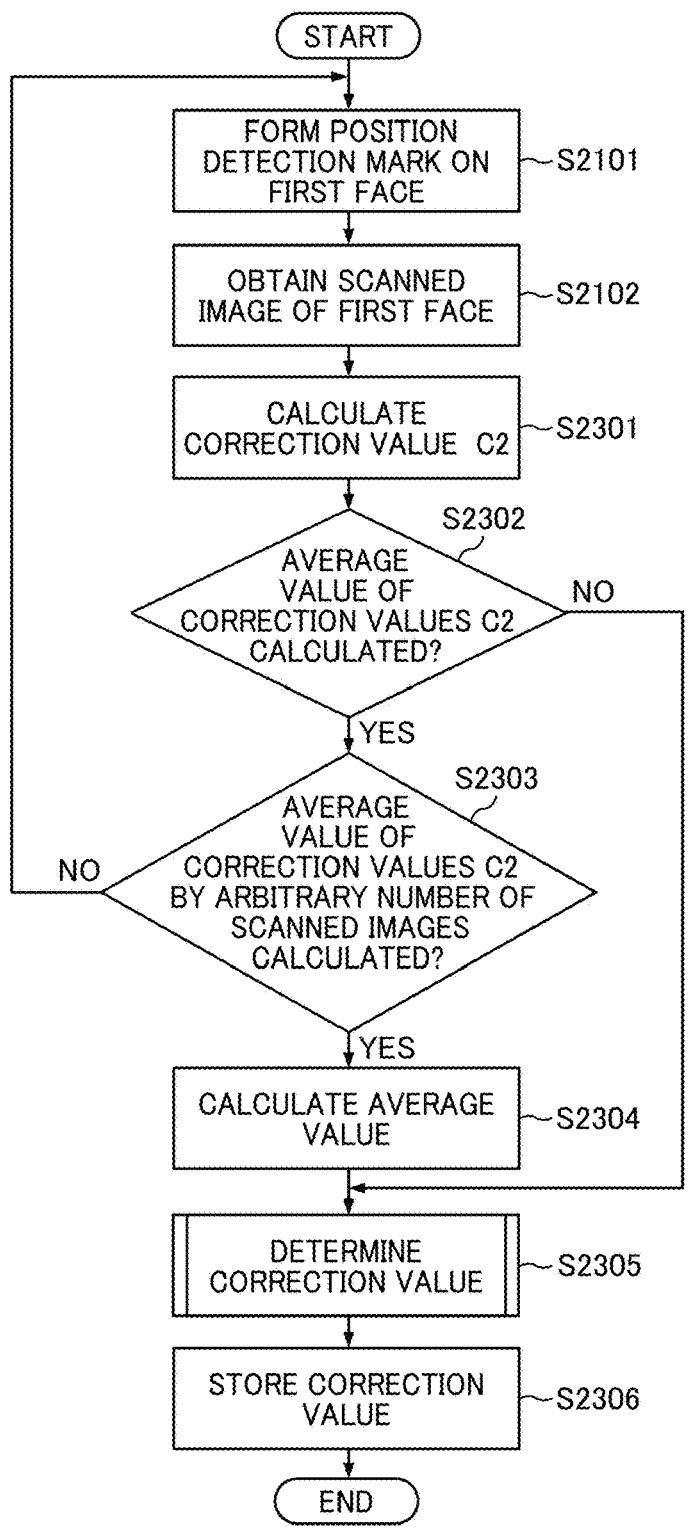
FIG. 23 is a flowchart of processes in which a correction value to adjust the position of the image is calculated, according to an embodiment of this disclosure.

FIG. 23 is a flowchart of processes in which correction values used to correct the position of an image to be formed on the print sheet M, according to an embodiment of this disclosure.

The correction value calculating unit 420 calculates the correction value C2 as described above, based on the coordinates of the position detection marks 7 and the end coordinates of the end portions of the print sheet M that are included in the scanned image of the first face of the print sheet M acquired in step S2102 (step S2301).

It is to be noted that an arbitrary number (e.g., a predetermined number or a set number) of the scanned images of the print sheet M may be obtained to calculate correction values based on the coordinates of the position detection marks 7 on the print sheet M and the end coordinates of the end portions of the print sheet M, so that the correction values may be averaged to be applied as the correction value C2 (step S2302). In other words, it is determined whether or not the average value of the correction values C2 is calculated in step S2302.

When the average value of the correction values C2 is calculated and used (YES in step S2302), it is determined whether or not the correction values C2 of the arbitrary number of the scanned images of the print sheet M are obtained (step S2303). When the correction values C2 of the arbitrary number of the scanned images of the print sheet M are not obtained (NO in step S2303), the processes of steps S2101 through S2302 are repeated until the correction values C2 for the arbitrary number of the scanned images of the print sheet M are obtained. By contrast, when the correction values C2 of the arbitrary number of the scanned images of the print sheet M are obtained (YES in step S2303), the correction value calculating unit 420 calculates the average value of the correction values C2 obtained by the correction value calculating unit 420 (step S2304).

When the average value of the correction values C2 is not used, that is, when the average value of the correction values C2 is not calculated, the processes from S2302 to S2304 are skipped.

Further, similar to the correction value C1, the correction value to be used for image formation is determined out of the correction value C2 and the average value of the correction values C2 in step S2305 using the flowchart of FIG. 22. As a result of the processes in the flowchart of FIG. 22, the correction value calculating unit 420 determines whether the correction value C2, the upper limit value of the correction limit values or the lower limit value of the correction limit values is used, and sends the selected one of the correction value C2, the upper limit value of the correction limit values and the lower limit value of the correction limit values, to the job information processing Unit 120 and the engine control unit 220.

The correction value calculating unit 420 stores the calculated correction value C2 or one of the correction limit values in the correction value storing unit 420a (S2306), and transmits the calculated correction value C2 or one of the correction limit values, to the job information processing unit 120 and the engine control unit 220.

The job information processing unit 120 and the engine control unit 220 adjust the position of the image on the first face of the print sheet M based on the selected one of the correction value C2 and the correction limit values sent from the correction value calculating unit 420.

As described above, the correction value C1 is calculated before the start of image formation to the second face of the print sheet M. Therefore, the position of the image to be formed on the first face of the print sheet M is adjusted based on the scanned image of the first face of the print sheet M, without taking the print sheet M to the outside of the image forming apparatus 5.

It is to be noted that, with regard to correction of the first face of the print sheet M, the position of the image of the same print sheet M cannot be adjusted.

In order to address this inconvenience, in the present embodiment, the calculated correction value C2 or one of the correction limit values is applied or used to the print sheet M on which image formation is performed after the correction value C2 is calculated. At this time, the processes of steps S2302 through S2304 may perform that a scanning error of the print sheet M is considered, that the correction values C2 by the arbitrary number of print sheets M are obtained continuously, that the average value of the correction values C2 based on the correction values C2 by the arbitrary number of print sheets M is calculated, and that the calculated average value is used to the subsequent print sheets.

At this time, for example, when the arbitrary number of print sheets is ten (10), the correction value C2 calculated based on the scanned images of the 1st to 10th print sheets is used when performing the image forming and outputting processes for the 11th print sheet.

In addition, when performing the image forming and outputting processes for the 12th print sheet, the correction value C2 calculated based on the scanned images of the 2nd to 11th print sheets is used.

As described above, by consecutively acquiring the correction values C2 for an arbitrary number of print sheets and applying the average value of the correction values C2 by the arbitrary number of print sheets to subsequent sheets, the positional deviation of the image, which is caused by external factors such as the change of temperature inside the image forming apparatus 5 due to the continuous image forming process, is reduced.

Figure 24:
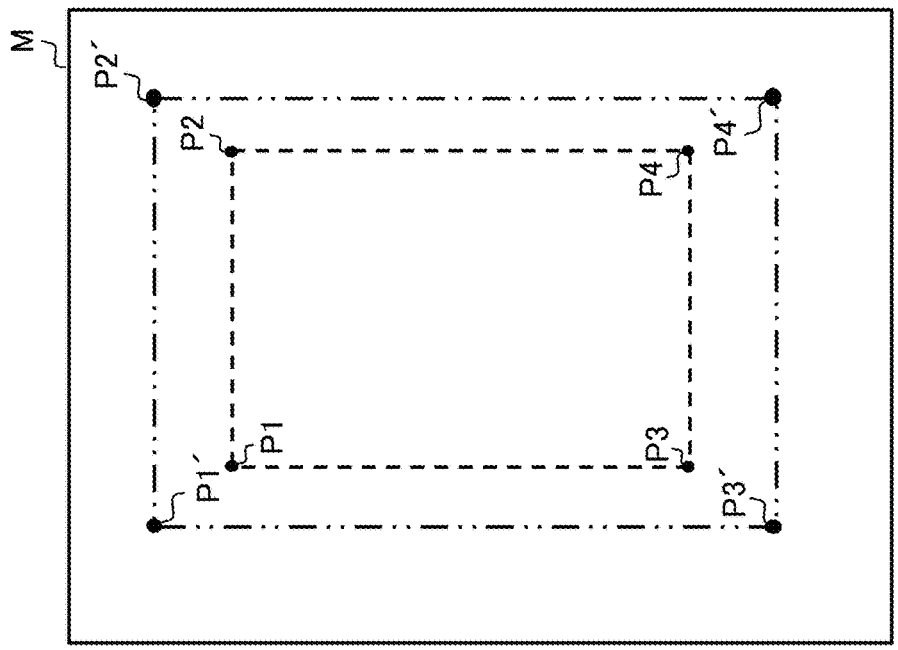
FIG. 24 is a diagram illustrating a state of an offset process, according to an embodiment of this disclosure.
Figure 25:
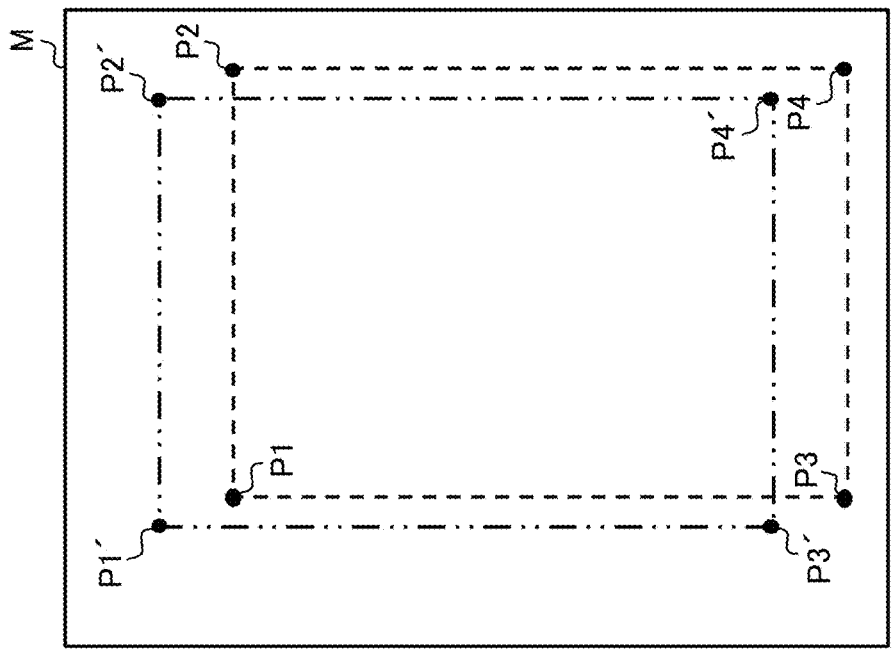
FIG. 25 is a diagram illustrating a state of a magnification process, according to an embodiment of this disclosure.
Figure 26:
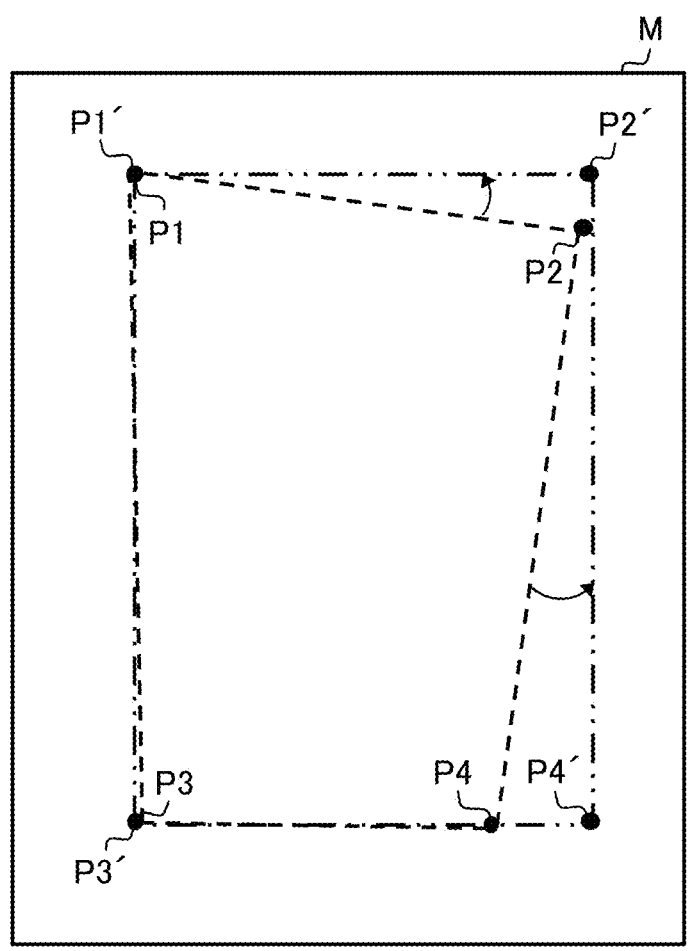
FIG. 26 is a diagram illustrating a state of an angular displacement correcting process, according to an embodiment of this disclosure.

Further, the job information processing unit 120 causes the RIP 110 to generate bitmap data by adjusting the position of an image to be formed on the print sheet M based on the correction value C1, the correction value C2 or the correction limit values, as illustrated in FIGS. 24 through 26.

FIG. 24 is a diagram illustrating a state of an offset process to move (and adjust) the position of an image to be formed on the print sheet M, from the actual position (i.e., the position coordinates P1, P2, P3 and P4) to the ideal position (i.e., the ideal position coordinates P1', P2', P3' and P4').

The offset process is performed by the offset processing unit 121.

The offset processing unit 121 moves the image to be formed on the print sheet M from the actual position (i.e., the position coordinates P1, P2, P3 and P4) to the ideal position (i.e., the ideal position coordinates P1', P2', P3' and P4') using the correction values C1 and C2 and the correction limit values as the amounts of movement of the coordinates.

FIG. 25 is a diagram illustrating a state of a magnification process to magnify the image to be formed on the print sheet M, from the actual position (i.e., the position coordinates P1, P2, P3 and P4) to the ideal position (i.e., the ideal position coordinates P1', P2', P3' and P4').

The magnification process is performed by the magnification adjustment processing unit 122.

It is to be noted that FIG. 25 illustrates a case in which the actual image is enlarged and adjusted to the ideal position. However, it is to be noted that the actual image may be reduced (or shrunk) and adjusted to the ideal position.

The magnification adjustment processing unit 122 uses the correction values C1 and C2 and the correction limit values as the magnification of the coordinates and multiplies by the coordinates of the actual position (i.e., the position coordinates P1, P2, P3 and P4). By so doing, the image to be formed on the print sheet M is moved to the ideal position (i.e., the ideal position coordinates P1', P2', P3' and P4').

FIG. 26 is a diagram illustrating a state of an angular displacement correcting process to rotate the image to be formed on the print sheet M within a plane of sheet conveyance, from the actual position (i.e., the position coordinates P1, P2, P3 and P4) to the ideal position (i.e., the ideal position coordinates P1', P2', P3' and P4').

The angular displacement correcting process is performed by the angular displacement correction processing unit 123.

The angular displacement correction processing unit 123 uses the correction values C1 and C2 and the correction limit values as the angle used to move the coordinates, and obtains the amounts of movement of the coordinates of the actual position (i.e., the position coordinates s P1, P2, P3 and P4) by trigonometric functions. By so doing, the image to be formed on the print sheet M is moved to the ideal position (i.e., the ideal position coordinates P1', P2', P3' and P4').

As described above, the image forming apparatus 5 according to the present embodiment calculates the correction value based on the end coordinates of the end portions on the front face of the print sheet and the center coordinates of the position detection marks on the print sheet and applies or uses the correction value for printing the back face of the print sheet before starting the printing of the back face of the print sheet. Therefore, the relative positional relation of the position of the image to be formed on the front face of the print sheet and the position of the image to be formed on the back face of the print sheet is corrected with accuracy.

It is to be noted that an electrophotographic image forming apparatus has been applied as the image forming apparatus 5 according to the present embodiment to describe this disclosure. However, the configuration to be applied to this disclosure is not limited thereto. For example, an inkjet image forming apparatus may also be employed as the image forming apparatus 5, for example.

Figure 27:
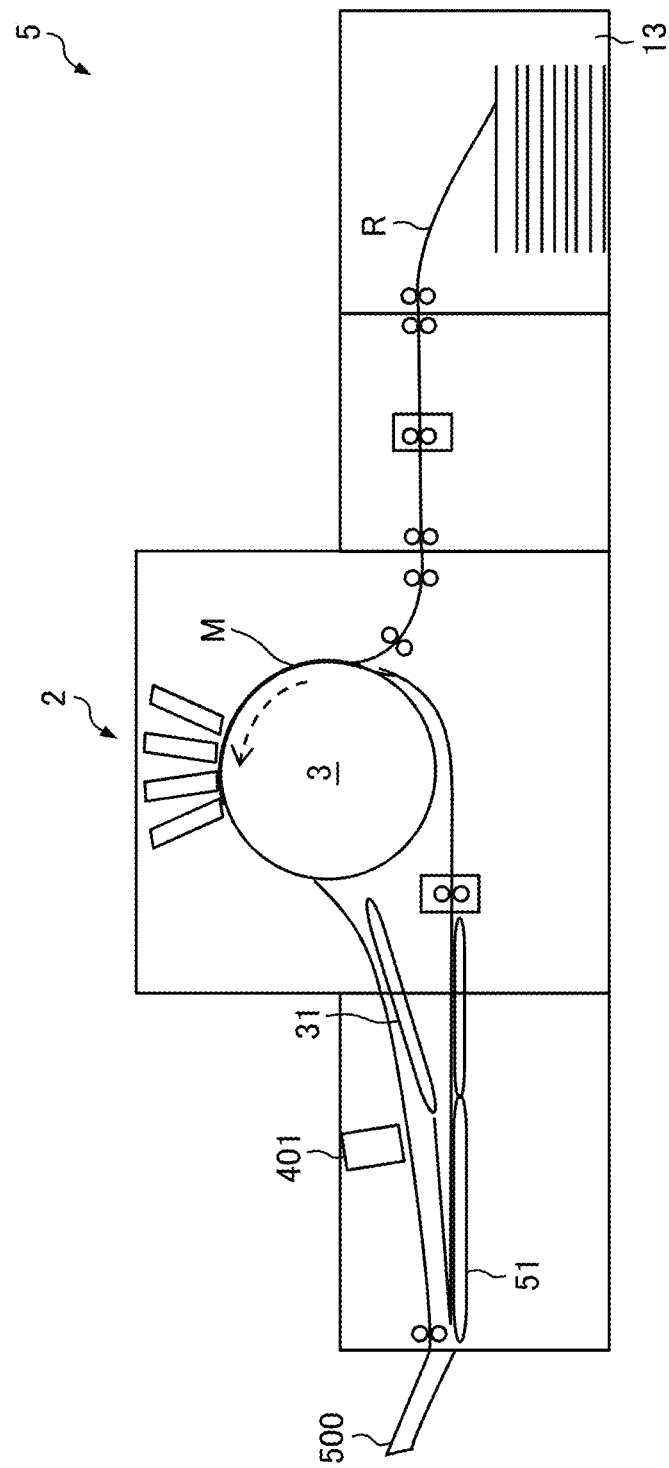
FIG. 27 is a diagram illustrating another configuration of the image forming apparatus according to according to an embodiment of this disclosure.

FIG. 27 is a diagram illustrating a configuration of the inkjet image forming apparatus 5 according to an embodiment of this disclosure. In the inkjet image forming apparatus 5 as illustrated in FIG. 27, the reading unit 401 is disposed downstream from a drying device 31 in the sheet conveying direction and upstream from a sheet reverse and conveyance passage 51 in the sheet conveying direction, along the sheet conveyance passage R of the print sheet M. The drying device 31 dries the print sheet M on which an image is formed in an image forming device including inkjet heads 2 and a drum 3. The sheet reverse and conveyance passage 51 reverses the print sheet M.

Figure 28A:
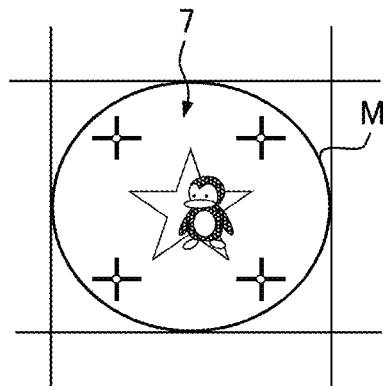
FIGS. 28A, 28B and 28C are diagrams illustrating various shapes of print sheets according to an embodiment of this disclosure.
Figure 28B:
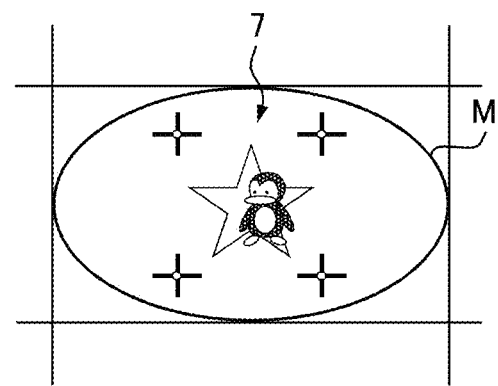
Figure 28C:
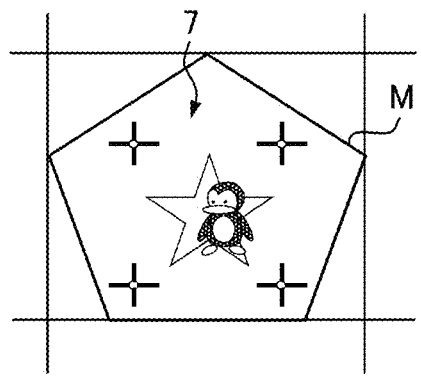

Further, FIGS. 28A, 28B, and 28C are diagrams illustrating example shapes of a print sheet applicable to this disclosure.

In the present embodiment, it has been described that the print sheet M has a rectangular shape. However, it is to be noted that, as illustrated in FIGS. 28A, 28B and 28C, any shape such as a circular shape and a polygonal shape is also applicable to this disclosure. For example, as illustrated in FIG. 28A, the position detection marks 7 may be printed by regarding multiple tangents drawn to a print sheet M having a circular shape as the end portions of the print sheet M.

It is to be noted that the position detection marks 7 are to be formed on the print sheet M. Similar to the print sheet M having a rectangular shape, the position of the image is adjusted by forming the position detection marks 7 on the print sheet M having a circular shape or the print sheet M having a polygonal shape.

Further, in an image position adjusting method in the image forming apparatus 5 according to the present embodiment, a reading unit such as the reading unit 401 is provided inside the image forming apparatus 5. Therefore, since the number of steps or processes to be performed by a user of the image forming apparatus for scanning printed media can be reduced, it is expected to achieve the effect to reduce the time to adjust the position of an image to be printed.

In addition, since no scanner is not to be provided outside the image forming apparatus, this disclosure is applicable even when an external scanner is not implemented.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming apparatus comprising:
an image forming device configured to form an image on a recording medium;
a reading device configured to scan the recording medium having a position detection mark on the recording medium as the image and generate a scanned image; and
circuitry configured to calculate a correction value to adjust a position of the image to be formed on the recording medium, based on the scanned image,
the reading device being configured to generate a first scanned image from a first face of the recording medium,
the circuitry being configured to calculate the correction value to adjust a position of an image to be formed on a second face of the recording medium based on the first scanned image generated from the first face of the recording medium, within a period from when the first scanned image is generated from the first face of the recording medium to when the image starts to be formed on the second face of the recording medium.

2. The image forming apparatus according to claim 1, wherein the circuitry is configured to calculate another correction value to adjust a position of an image to be formed on the first face of the recording medium, based on the first scanned image generated from the first face of the recording medium.

3. The image forming apparatus according to claim 2, wherein the image forming device is configured to adjust a position of the image to be formed on the first face of the recording medium after the correction value is calculated, based on said another correction value.

4. The image forming apparatus according to claim 1, wherein the circuitry is configured to calculate the correction value and another correction value to adjust a position of an image to be formed on the first face of the recording medium, based on coordinates of the position detection mark included in the first scanned image generated from the first face of the recording medium and coordinates of end portions of the recording medium.

5. The image forming apparatus according to claim 1, wherein the image forming device is configured to adjust a position of the image to be formed on the second face of the recording medium, based on the correction value.

6. The image forming apparatus according to claim 1, wherein the image forming device is configured to move the position of the image based on the correction value calculated by the circuitry to form the image on the recording medium.

7. The image forming apparatus according to claim 1, wherein the image forming device is configured to change a dimension of the image based on the correction value calculated by the circuitry to form the image on the recording medium.

8. The image forming apparatus according to claim 1, wherein the image forming device is configured to rotate the image within a plane of sheet conveyance based on the correction value calculated by the circuitry to form the image on the recording medium.

9. An image forming apparatus comprising:
an image forming device configured to form an image on a recording medium;
a fixing body configured to fix the image formed on the recording medium to the recording medium;
a branching portion configured to change a direction of the recording medium on which the image is formed, between a direction toward an outside of the image forming apparatus and a direction to a passage conveying the recording medium in a different direction from the direction toward the outside of the image forming apparatus;
a reading device configured to scan the recording medium having a position detection mark on the recording medium as the image and generate a scanned image, the reading device being disposed between the fixing body and the branching portion in a sheet conveying direction of the recording medium; and
circuitry configured to calculate a correction value to adjust a position of the image to be formed on the recording medium, based on the scanned image.

10. An image forming method performed by an image forming apparatus, the image forming method comprising:
forming an image on a recording medium;
scanning a first face of the recording medium having a position detection mark on the recording medium;
generating a first scanned image from the first face of the recording medium; and
calculating a correction value to adjust a position of an image to be formed on a second face of the recording medium based on the first scanned image generated from the first face of the recording medium, within a period from when the first scanned image is generated from the first face of the recording medium to when the image starts to be formed on the second face of the recording medium.

11. An image forming apparatus comprising:
an image forming device configured to form an image on a recording medium;
a drying device configured to dry the image formed on the recording medium to the recording medium;
a branching portion configured to change a direction of the recording medium on which the image is formed, between a direction toward an outside of the image forming apparatus and a direction to a passage conveying the recording medium in a different direction from the direction toward the outside of the image forming apparatus;
a reading device configured to scan the recording medium having a position detection mark on the recording medium as the image and generate a scanned image, the reading device being disposed between the drying device and the branching portion in a sheet conveying direction of the recording medium; and
circuitry configured to calculate a correction value to adjust a position of the image to be formed on the recording medium, based on the scanned image.

12. The image forming apparatus according to claim 11, wherein
the reading device is configured to generate a first scanned image from a first face of the recording medium; and
the circuitry is configured to calculate another correction value to adjust a position of an image to be formed on the first face of the recording medium, based on the first scanned image generated from the first face of the recording medium.

13. The image forming apparatus according to claim 12, wherein the image forming device is configured to adjust a position of the image to be formed on the first face of the recording medium after the correction value is calculated, based on said another correction value.

14. The image forming apparatus according to claim 11, wherein
the reading device is configured to generate a first scanned image from a first face of the recording medium; and
the circuitry is configured to calculate the correction value and another correction value to adjust a position of an image to be formed on the first face of the recording medium, based on coordinates of the position detection mark included in the first scanned image generated from the first face of the recording medium and coordinates of end portions of the recording medium.

15. The image forming apparatus according to claim 11, wherein the image forming device is configured to adjust a position of the image to be formed on a second face of the recording medium, based on the correction value.

16. The image forming apparatus according to claim 11, wherein the image forming device is configured to move the position of the image based on the correction value calculated by the circuitry to form the image on the recording medium.

17. The image forming apparatus according to claim 11, wherein the image forming device is configured to change a dimension of the image based on the correction value calculated by the circuitry to form the image on the recording medium.

18. The image forming apparatus according to claim 11, wherein the image forming device is configured to rotate the image within a plane of sheet conveyance based on the correction value calculated by the circuitry to form the image on the recording medium.

* * * * *